United States Patent
Funamoto

(10) Patent No.: US 9,826,172 B2
(45) Date of Patent: Nov. 21, 2017

(54) SPECTROSCOPIC CAMERA AND SPECTROSCOPIC IMAGE PROCESSING METHOD

(71) Applicant: SEIKO EPSON CORPORATION, Tokyo (JP)

(72) Inventor: Tatsuaki Funamoto, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 233 days.

(21) Appl. No.: 14/185,486

(22) Filed: Feb. 20, 2014

(65) Prior Publication Data

US 2014/0240513 A1    Aug. 28, 2014

(30) Foreign Application Priority Data

Feb. 22, 2013 (JP) ................................ 2013-032930

(51) Int. Cl.

| | |
|---|---|
| G01J 3/28 | (2006.01) |
| H04N 5/33 | (2006.01) |
| G01J 3/10 | (2006.01) |
| G01J 3/26 | (2006.01) |
| H04N 5/217 | (2011.01) |
| H04N 5/225 | (2006.01) |
| H04N 5/235 | (2006.01) |

(52) U.S. Cl.
CPC .................. *H04N 5/33* (2013.01); *G01J 3/10* (2013.01); *G01J 3/26* (2013.01); *G01J 3/2803* (2013.01); *H04N 5/217* (2013.01); *H04N 5/2254* (2013.01); *H04N 5/2256* (2013.01); *H04N 5/2354* (2013.01)

(58) Field of Classification Search
None
See application file for complete search history.

(56) References Cited

U.S. PATENT DOCUMENTS

| | | | |
|---|---|---|---|
| 6,614,533 B1 | 9/2003 | Hata | |
| 9,270,898 B2 * | 2/2016 | Funamoto | ............... H04N 5/243 |
| 9,426,380 B2 * | 8/2016 | Funamoto | ................. G01J 3/26 |

(Continued)

FOREIGN PATENT DOCUMENTS

| | | |
|---|---|---|
| JP | A-2000-329617 | 11/2000 |
| JP | A-2009-033222 | 2/2009 |

(Continued)

*Primary Examiner* — Mohammad J Rahman
(74) *Attorney, Agent, or Firm* — Oliff PLC

(57) ABSTRACT

A spectroscopic analysis apparatus includes a light source section having a first light source and second light source that radiate light fluxes, a wavelength tunable interference filter, an imaging section that captures light having passed through the wavelength tunable interference filter to acquire a first spectroscopic image when the object being imaged is irradiated with the light from the first light source and a second spectroscopic image when the object being imaged is irradiated with the light from the second light source, a pixel detector that detects an abnormal pixel in the first spectroscopic image, and a light amount corrector that replaces the amount of light at the abnormal pixel in the first spectroscopic image with the amount of light at a pixel in the second spectroscopic image that is located in the same position as the abnormal pixel.

9 Claims, 13 Drawing Sheets

(56) References Cited

U.S. PATENT DOCUMENTS

| | | | | |
|---|---|---|---|---|
| 2001/0045529 | A1* | 11/2001 | Iketaki | G01J 3/4406 250/493.1 |
| 2004/0260470 | A1* | 12/2004 | Rast | G06Q 10/06 701/300 |
| 2006/0152586 | A1* | 7/2006 | Komiya | A61B 5/0088 348/207.99 |
| 2006/0251408 | A1* | 11/2006 | Konno | A61B 5/4547 396/14 |
| 2008/0007691 | A1* | 1/2008 | Mihashi | A61B 3/0025 351/206 |
| 2009/0027518 | A1* | 1/2009 | Kita | G02B 5/284 348/231.99 |
| 2009/0131802 | A1* | 5/2009 | Fulghum | A61B 5/0059 600/478 |
| 2009/0185163 | A1 | 7/2009 | Shimazu et al. | |
| 2010/0245832 | A1 | 9/2010 | Saari | |
| 2011/0013197 | A1* | 1/2011 | Schwarz | G01J 3/50 356/601 |
| 2011/0043661 | A1* | 2/2011 | Podoleanu | A61B 3/102 348/239 |
| 2011/0157409 | A1* | 6/2011 | Adachi | G09G 5/00 348/222.1 |
| 2011/0299073 | A1* | 12/2011 | Sakurai | G01J 3/10 356/319 |
| 2012/0026317 | A1* | 2/2012 | Nakahira | H04N 7/183 348/92 |
| 2012/0327207 | A1* | 12/2012 | Oe | A61B 5/0064 348/77 |
| 2013/0016352 | A1* | 1/2013 | Kita | G01J 3/501 356/402 |

FOREIGN PATENT DOCUMENTS

| | | |
|---|---|---|
| JP | A-2009-168748 | 7/2009 |
| JP | 2010-515971 A | 5/2010 |
| JP | A-2011-027734 | 2/2011 |
| WO | 2008/085724 A1 | 7/2008 |

\* cited by examiner

SPECTROSCOPIC CAMERA AND SPECTROSCOPIC IMAGE PROCESSING METHOD

BACKGROUND

1. Technical Field

The present invention relates to a spectroscopic camera and a spectroscopic image processing method.

2. Related Art

There is a known apparatus that radiates light toward an object being imaged and captures light reflected off the object being imaged to produce a captured image (see JP-A-2009-33222, for example).

The imaging apparatus (spectroscopic camera) described in JP-A-2009-33222 causes light from the object to be incident on a Fabry-Perot interference filter and allows an image sensor to receive light having passed through the Fabry-Perot interference filter for acquisition of a spectroscopic image.

A spectroscopic camera using a Fabry-Perot interference filter has an advantage of compactness and lightweight, as described in JP-A-2009-33222. On the other hand, to acquire a spectroscopic image based on a sufficient amount of near infrared light, a near infrared light source needs to be provided in an imaging apparatus body. However, providing such a light source in the spectroscopic camera, which is compact as described above, results in a short distance between the light source and an imaging lens, which causes light specularly reflected off the surface of an object being imaged to enter the imaging lens, undesirably resulting in abnormal brightness of part of a spectroscopic image.

SUMMARY

An advantage of some aspects of the invention is to provide a spectroscopic camera capable of capturing a precise spectroscopic image even when light from a light source is specularly reflected off the surface of an object being imaged and also provide a spectroscopic image processing method.

An aspect of the invention is directed to a spectroscopic camera including a light source section that radiates first light and second light that travel in radiation directions different from each other toward an object being imaged, a spectroscopic device that separates light reflected off the object being imaged to select light of a predetermined wavelength, an imaging section that captures the light of the wavelength selected by the spectroscopic device to acquire a first spectroscopic image when the object being imaged is irradiated with the first light and a second spectroscopic image when the object being imaged is irradiated with the second light, a pixel detection section that detects an abnormal pixel in the first spectroscopic image that is a pixel where the ratio of the amount of light at the pixel to a reference amount of light obtained when a reference object is irradiated with the first or second light is greater than or equal to a predetermined value, and a light amount correction section that replaces the amount of light at the abnormal pixel in the first spectroscopic image with the amount of light at a pixel in the second spectroscopic image that is located in the same position as the abnormal pixel.

The reference object in the aspect of the invention is, for example, a reference white plate or any object having a perfect diffusing surface or a quasi-perfect diffusing surface. Consider a case where a perfect diffusing surface is irradiated with light and the amount of light reflected off the perfect diffusing surface is used as a reference amount of light. The ratio of the amount of light at each pixel in each of the spectroscopic images to the reference amount of light is a reflectance ratio with reference to the perfect diffusing surface. When specular reflection occurs at a portion of the surface of the object being imaged, the portion has reflectance greater than that of the perfect diffusing surface, and the reflectance ratio is therefore greater than "1". The pixel detection section can therefore detect an abnormal pixel corresponding to the specular reflection portion.

The reference amount of light is not limited to the amount of light reflected off a perfect diffusing surface. For example, the surface of the reference object may absorb or otherwise interact with part of light incident thereon. In this case, the reflectance has a finite value lower than 100% (99%, for example). When the amount of light reflected off such a reference object is used the reference amount of light, the pixel detection section can detect a pixel where the reflectance ratio is greater than a predetermined value smaller than 1 (0.99, for example) as an abnormal pixel corresponding to specular reflection.

In the aspect of the invention, the first light and the second light radiated from the light source section toward the object being imaged travel in different radiation directions. Therefore, on the surface of the object being imaged, a portion that specularly reflects the first light and a portion that specularly reflects the second light are located in different positions. As a result, when the pixel detection section detects an abnormal pixel in each of the spectroscopic images as described above, the position where the abnormal pixel is located in the first spectroscopic image differs from the position where the abnormal pixel is located in the second spectroscopic image. That is, even when an abnormal pixel is detected in a pixel position in the first spectroscopic image, the pixel in the same pixel position in the second spectroscopic image may not be an abnormal pixel in some cases.

The light amount correction section can therefore replace the amount of light at an abnormal pixel in the first spectroscopic image with the amount of light at the corresponding pixel in the second spectroscopic image to correct the abnormal pixel in the first spectroscopic image to a normal pixel, whereby a precise spectroscopic image can be acquired.

In the spectroscopic camera according to the aspect of the invention, it is preferable that the spectroscopic device is capable of changing the wavelength to be selected.

With this configuration, since the spectroscopic device is capable of changing the wavelength to be selected, the spectroscopic camera can acquire a spectroscopic image of a target wavelength desired by a user.

In the spectroscopic camera according to the aspect of the invention, it is preferable that the light source section includes a first light source that radiates the first light and a second light source that radiates the second light.

With this configuration, the light source section includes the first light source corresponding to the first light and the second light source corresponding to the second light. In the configuration described above, switching the light source in operation between the first light source and the second light source readily allows the light source section to radiate one of the light fluxes that travels in different radiation directions (first light and second light) toward the object being imaged.

In the spectroscopic camera according to the aspect of the invention, it is preferable that the light source section includes a light emitter and a direction changer that changes the direction in which light emitted from the light emitter travels.

With this configuration, the direction changer formed, for example, of a lens changes the radiation direction (optical axis direction) of the light emitted from the single light emitter to direct the light toward the object being imaged. The configuration described above also allows the first light and the second light, which travel in different radiation directions, to be outputted, and the reduction in the number of light sources allows reduction in the size and cost of the spectroscopic camera.

Another aspect of the invention is directed to a spectroscopic camera including a light source section that radiates light toward an object being imaged, a first spectroscopic device that separates light reflected off the object being imaged and traveling in a first direction to select light of a predetermined wavelength, a second spectroscopic device that separates light reflected off the object being imaged and traveling in a second direction different from the first direction to select light of the predetermined wavelength, a first imaging section that captures the light of the wavelength selected by the first spectroscopic device to acquire a first spectroscopic image, a second imaging section that captures the light of the wavelength selected by the second spectroscopic device to acquire a second spectroscopic image, a pixel detection section that detects an abnormal pixel in the first spectroscopic image that is a pixel where the ratio of the amount of light at the pixel to a reference amount of light obtained when a reference object is irradiated with light is greater than or equal to a predetermined value, and a light amount correction section that replaces the amount of light at the abnormal pixel in the first spectroscopic image with the amount of light at a pixel in the second spectroscopic image in the same position as the abnormal pixel.

In the aspect of the invention, part of the light reflected off the object being imaged, specifically, light reflected in the predetermined first direction passes through the first spectroscopic device and is received by the first imaging section. The first spectroscopic image is thus acquired. Further, light reflected off the object being imaged in the second direction different from the first direction passes through the second spectroscopic device and is received by the second imaging section. The second spectroscopic image is thus acquired. The thus acquired first and second spectroscopic images are therefore images captured at different angles when viewed from the object being imaged, and a specular reflection portion of the surface of the object being imaged is also located in different pixel positions in the images. Therefore, detecting an abnormal pixel in each of the first and second spectroscopic images and replacing the amount of light at the abnormal pixel in the first spectroscopic image with the amount of light at the pixel in the second spectroscopic image that corresponds to the abnormal pixel allows the amount of light at the abnormal pixel to be replaced with the amount of light at a normal pixel where no specular reflection occurs, whereby a precise spectroscopic image can be acquired, as in the aspect of the invention described above.

In the spectroscopic camera according to the aspect of the invention, it is preferable that each of the first and second spectroscopic devices is capable of changing the wavelength to be selected.

With this configuration, since each of the first and second spectroscopic devices is capable of changing the wavelength to be selected, the spectroscopic camera can acquire a spectroscopic image of a target wavelength desired by the user.

In the spectroscopic camera according to the aspect of the invention, it is preferable that the pixel detection section detects an abnormal pixel in the second spectroscopic image that is a pixel where the ratio of the amount of light at the pixel to the reference amount of light is greater than or equal to a predetermined value, and when pixels in the same position in the first and second spectroscopic images are not the abnormal pixel, the light amount correction section replaces the amount of light at the pixel in the first spectroscopic image with the average of the amounts of light at the pixels in the first and second spectroscopic images.

With this configuration, when pixels in the same position in the first and second spectroscopic images are not abnormal pixels (are normal pixels), the amount of light at the pixel in the first spectroscopic image is replaced with the average of the amounts of light at the two pixels, whereby a more precise spectroscopic image can be acquired.

In the spectroscopic camera according to the aspect of the invention, it is preferable that the spectroscopic device is a wavelength tunable Fabry-Perot etalon.

With this configuration, each of the spectroscopic devices is a wavelength tunable Fabry-Perot etalon. A wavelength tunable Fabry-Perot etalon has a simple configuration in which a pair of reflection films are simply so disposed that they face each other and can readily change the wavelength of light to be separated by changing the dimension of the gap between the reflection films. Using a thus configured wavelength tunable Fabry-Perot etalon allows reduction in the size and thickness of the spectroscopic camera as compared with a case where an AOTF (acousto-optic tunable filter), an LCTF (liquid crystal tunable filter), or any other large spectroscopic device is used.

Still another aspect of the invention is directed to a spectroscopic image processing method in a spectroscopic camera including a light source section that radiates light toward an object being imaged, a spectroscopic device that separates light incident from the object being imaged to select light of a predetermined wavelength, and an imaging section that captures the light of the wavelength selected by the spectroscopic device to acquire a spectroscopic image, the method including a first image acquisition step of radiating first light from the light source section toward the object being imaged to capture a first spectroscopic image with the imaging section, a second image acquisition step of radiating second light different from the first light in terms of radiation direction from the light source section toward the object being imaged to capture a second spectroscopic image with the imaging section, a pixel detection step of detecting an abnormal pixel in the first spectroscopic image that is a pixel where the ratio of the amount of light at the pixel to a reference amount of light obtained when a reference object is irradiated with the first or second light is greater than or equal to a predetermined value, and a light amount correction step of replacing the amount of light at the abnormal pixel in the first spectroscopic image with the amount of light at a pixel in the second spectroscopic image located in the same position as the abnormal pixel.

In the aspect of the invention, the first light and the second light radiated from the light source section travel in different radiation directions. As a result, the pixel position of an abnormal pixel in the first spectroscopic image acquired in the first image acquisition step differs from the pixel position of an abnormal pixel in the second spectroscopic image acquired in the second image acquisition step. Thereafter, in the pixel detection step, the pixel position of the abnormal pixel in the first spectroscopic image is detected, and in the light amount correction step, the amount of light at the abnormal pixel in the first spectroscopic image is replaced with the amount of light at the pixel in the second spectroscopic image that corresponds to the abnormal pixel. The first spectroscopic image can thus be corrected to a spectroscopic image having no abnormal pixel, whereby a precise spectroscopic image can be acquired, as in the aspect of the invention described above.

Yet another aspect of the invention is directed to a spectroscopic image processing method in a spectroscopic camera including a light source section that radiates light toward an object being imaged, a first spectroscopic device that separates light reflected off the object being imaged and traveling in a first direction to select light of a predetermined wavelength, a second spectroscopic device that separates light reflected off the object being imaged and traveling in a second direction different from the first direction to select light of the predetermined wavelength, a first imaging section that captures the light of the wavelength selected by the first spectroscopic device to acquire a first spectroscopic image, and a second imaging section that captures the light of the wavelength selected by the second spectroscopic device to acquire a second spectroscopic image, the method including an image acquisition step of radiating the light from the light source section toward the object being imaged to capture the first spectroscopic image and the second spectroscopic image, a pixel detection step of detecting an abnormal pixel in the first spectroscopic image that is a pixel where the ratio of the amount of light at the pixel to a reference amount of light obtained when a reference object is irradiated with light is greater than or equal to a predetermined value, and a light amount correction step of replacing the amount of light at the abnormal pixel in the first spectroscopic image with the amount of light at a pixel in the second spectroscopic image in the same position as the abnormal pixel.

In the aspect of the invention, the pixel position of an abnormal pixel in the first spectroscopic image based on the light reflected off the object being imaged and traveling in the first direction differs from the pixel position of an abnormal pixel in the second spectroscopic image based on the light reflected off the object being imaged and traveling in the second direction. A precise spectroscopic image can therefore be acquired by carrying out the pixel detection step and the light amount correction step to replace the amount of light at the abnormal pixel in the first spectroscopic image with the amount of light at the pixel in the second spectroscopic image that corresponds to the abnormal pixel, as in the aspect of the invention described above.

Still yet another aspect of the invention is directed to a spectroscopic camera that captures a first spectroscopic image produced when an object being imaged is irradiated with first light and a second spectroscopic image produced when the object being imaged is irradiated with second light different from the first light in terms of radiation direction. The spectroscopic camera judges whether or not the amount of light received at each pixel in the first spectroscopic image is an abnormal value, and when the spectroscopic camera judges that the amount of received light at a pixel is an abnormal value, the amount of received light at the pixel is replaced with the amount of received light at a pixel in the same position in the second spectroscopic image.

In the aspect of the invention, when the amount of light received at a pixel in the first spectroscopic image is an abnormal value, the amount of light at the pixel is replaced with the amount of light at a pixel in the same position in the second spectroscopic image. The first spectroscopic image can thus be corrected to an image having no pixel showing an abnormal value, whereby a precise spectroscopic image can be acquired, as in the aspect of the invention described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
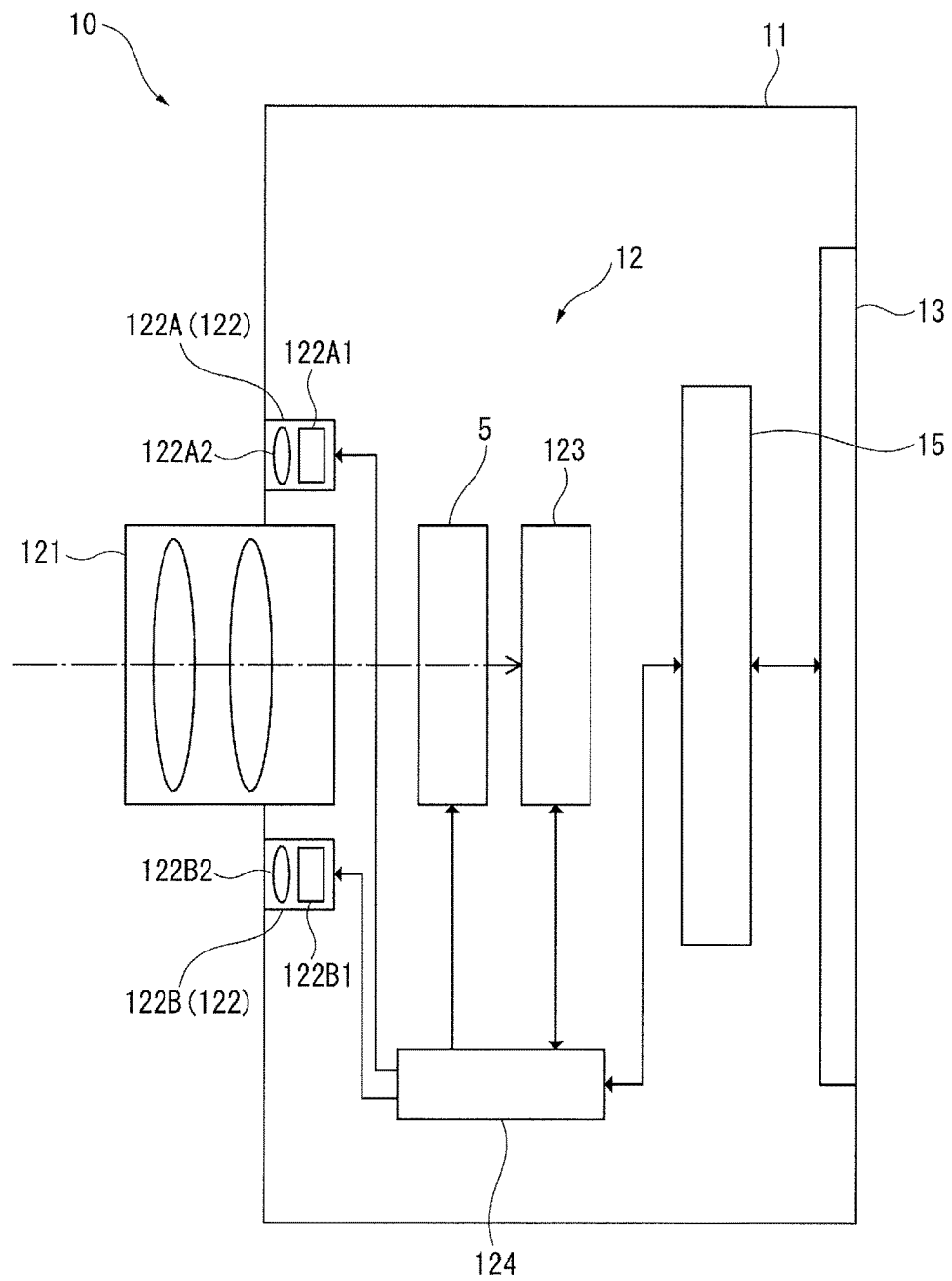
FIG. 1 shows a schematic configuration of a spectroscopic analysis apparatus of a first embodiment according to the invention.
Figure 2:
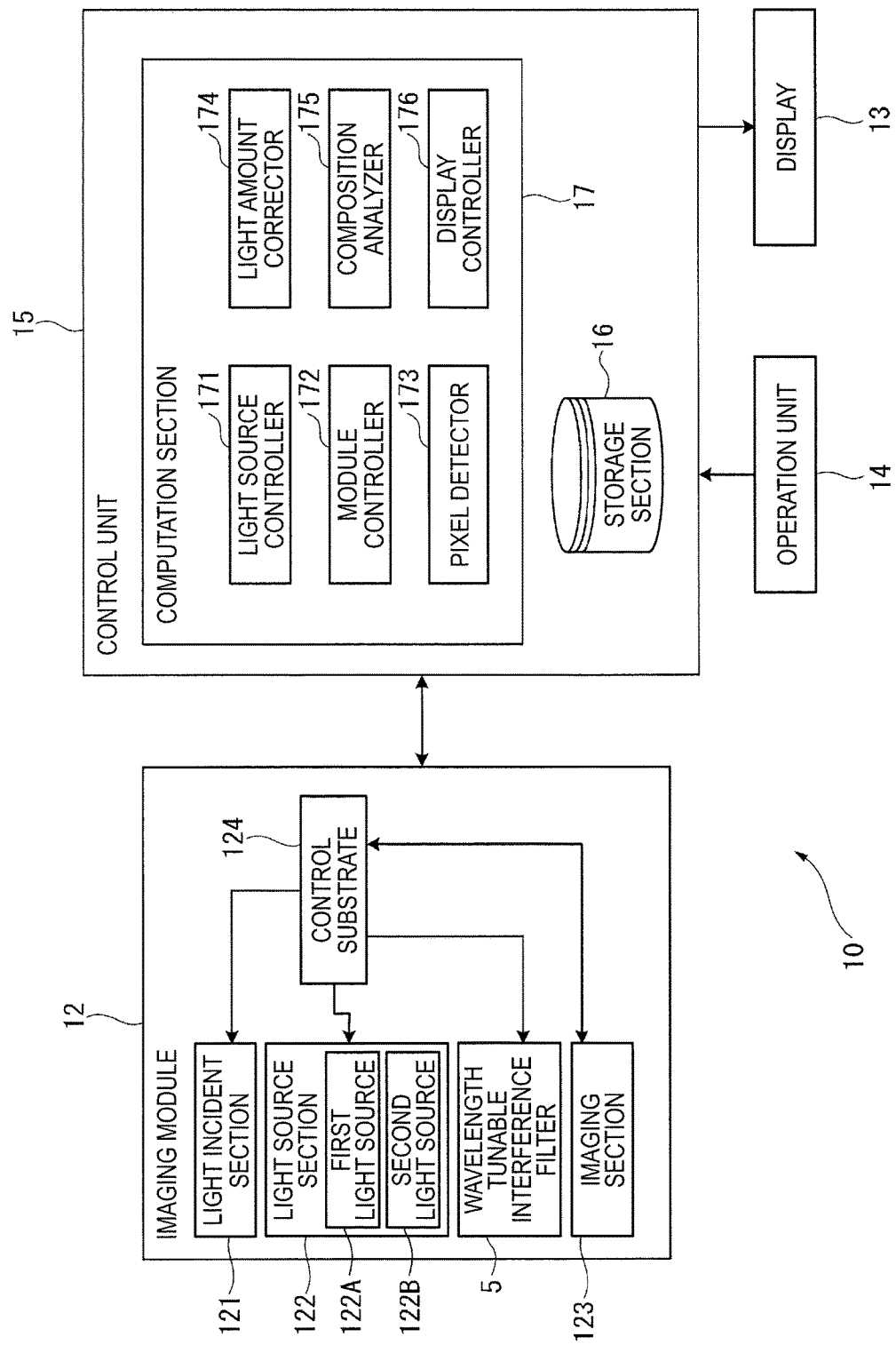
FIG. 2 is a block diagram showing the schematic configuration of the spectroscopic analysis apparatus of the first embodiment.

A spectroscopic analysis apparatus (spectroscopic camera) of a first embodiment according to the invention will be described below with reference to the drawings.
Schematic Configuration of Spectroscopic Analysis Apparatus FIG. 1 is a schematic view showing a schematic configuration of the spectroscopic analysis apparatus of the first embodiment. FIG. 2 is a block diagram showing the schematic configuration of the spectroscopic analysis apparatus.

A spectroscopic analysis apparatus 10 is a spectroscopic camera according to an embodiment of the invention and an apparatus that captures spectroscopic images of an object being imaged at a plurality of wavelengths, analyzes a spectrum in an infrared wavelength region (target wavelength region in spectroscopic image) at each pixel based on the captured spectroscopic images, and analyzes the composition of the object being imaged based on the analyzed spectra.

The spectroscopic analysis apparatus 10 of the present embodiment includes an enclosure 11, an imaging module 12, a display 13, an operation unit 14 (see FIG. 2), and a control unit 15, as shown in FIG. 1.

Configuration of Imaging Module

The imaging module 12 includes a light incident section 121 (incident light optical system), a light source section 122, a wavelength tunable interference filter 5 (spectroscopic device), an imaging section 123, which receives incident light, and a control substrate 124.

Configuration of Light Incident Section

The light incident section 121 is formed of a plurality of lenses, as shown in FIG. 1. The light incident section 121 has an angular field of view limited by the plurality of lenses to a predetermined angle or smaller and focuses an image of an object under inspection within the angular field of view onto the imaging section 123. Some of the plurality of lenses have adjustable inter-lens gaps that can be adjusted, for example, when a user operates the operation unit 14, whereby an acquired image can be enlarged or reduced. In the present embodiment, the lenses that form the light incident section 121 preferably form a telecentric lens unit. The telecentric lens unit can align the principal ray of incident light with a direction parallel to the optical axis of the light incident section 121, whereby the aligned light can be incident on a fixed reflection film 54 and a movable reflection film 55 of the wavelength tunable interference filter 5, which will be described later, at right angles. Further, when a telecentric lens unit is used as the lenses that form the light incident section 121, an aperture is provided in the focal position of the telecentric lens unit. The aperture has an aperture diameter controlled by the control unit 15 and can therefore control the angle of incidence of light incident on the wavelength tunable interference filter 5. The angle of incidence of the incident light, which is limited by the group of lenses, the aperture, and other components, is preferably limited, although it varies depending on lens design and other factors, to 20 degrees or smaller with respect to the optical axis.

Configuration of Light Source Section

The light source section 122 includes a first light source 122A and a second light source 122B, as shown in FIGS. 1 and 2. In the present embodiment, the two light sources 122A and 122B are provided by way of example, and three or more light sources may be provided.

The first light source 122A is formed of a light emitter 122A1 and a lens 122A2 provided in a position shifted from the light emitter 122A1 in the light exiting direction, and the second light source 122B is formed of a light emitter 122B1 and a lens 122B2 provided in a position shifted from the light emitter 122B1 in the light exiting direction. Each of the light emitters 122A1 and 122B1 is an LED or any other light source that emits light of a wavelength to be measured. In the present embodiment, to perform spectroscopic measurement in an infrared region, an infrared light source is used. The lens 122A2 collects the light emitted from the light emitter 122A1 and outputs the collected light along a first radiation direction D1 (see FIG. 6) toward an object being imaged X. The lens 122B2 collects the light emitted from the light emitter 122B1 and outputs the collected light along a second radiation direction D2 (see FIG. 6) toward the object being imaged X.

Configuration of Wavelength Tunable Interference Filter

Figure 3:
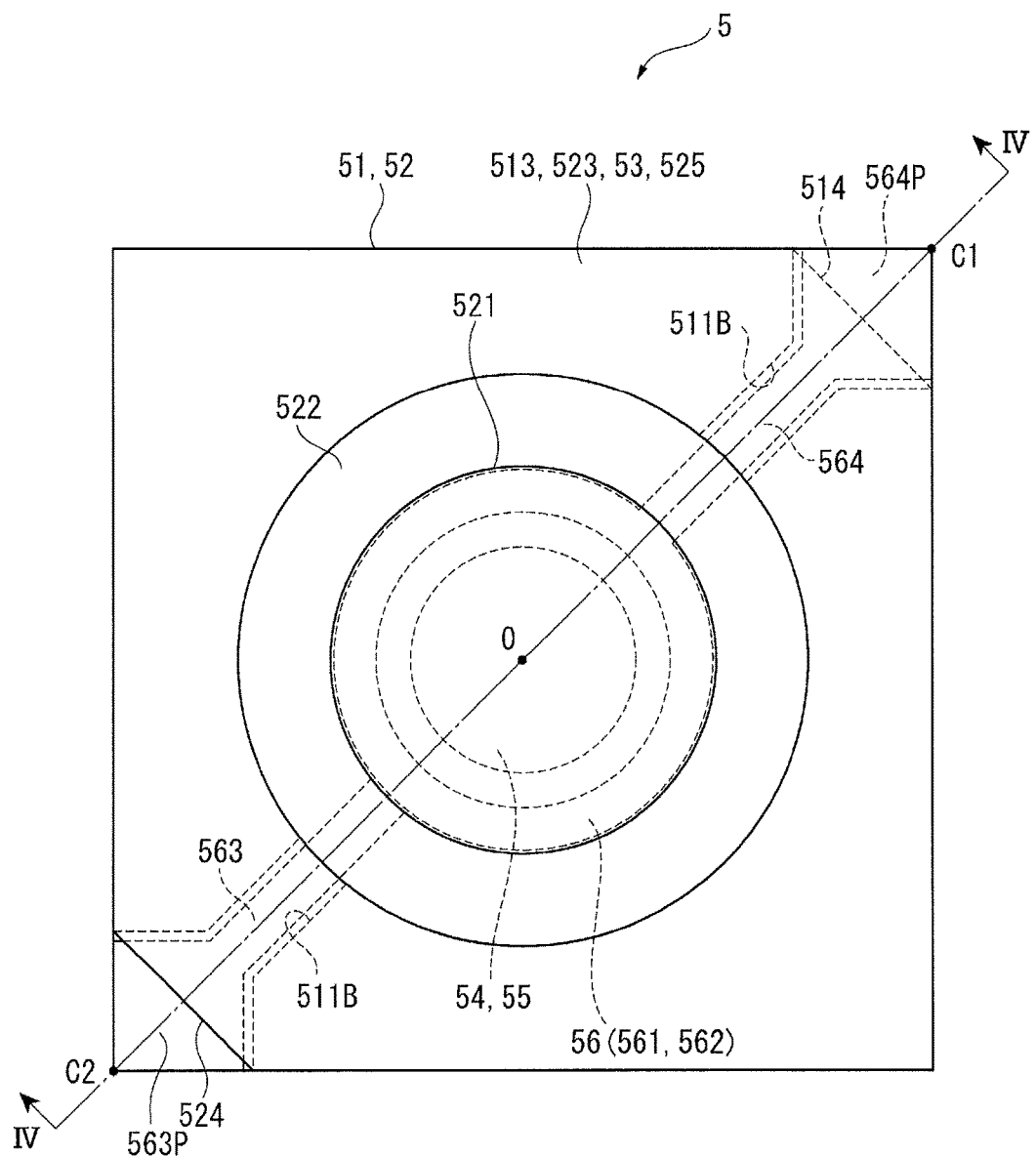
FIG. 3 is a plan view showing a schematic configuration of a wavelength tunable interference filter of the first embodiment.
Figure 4:
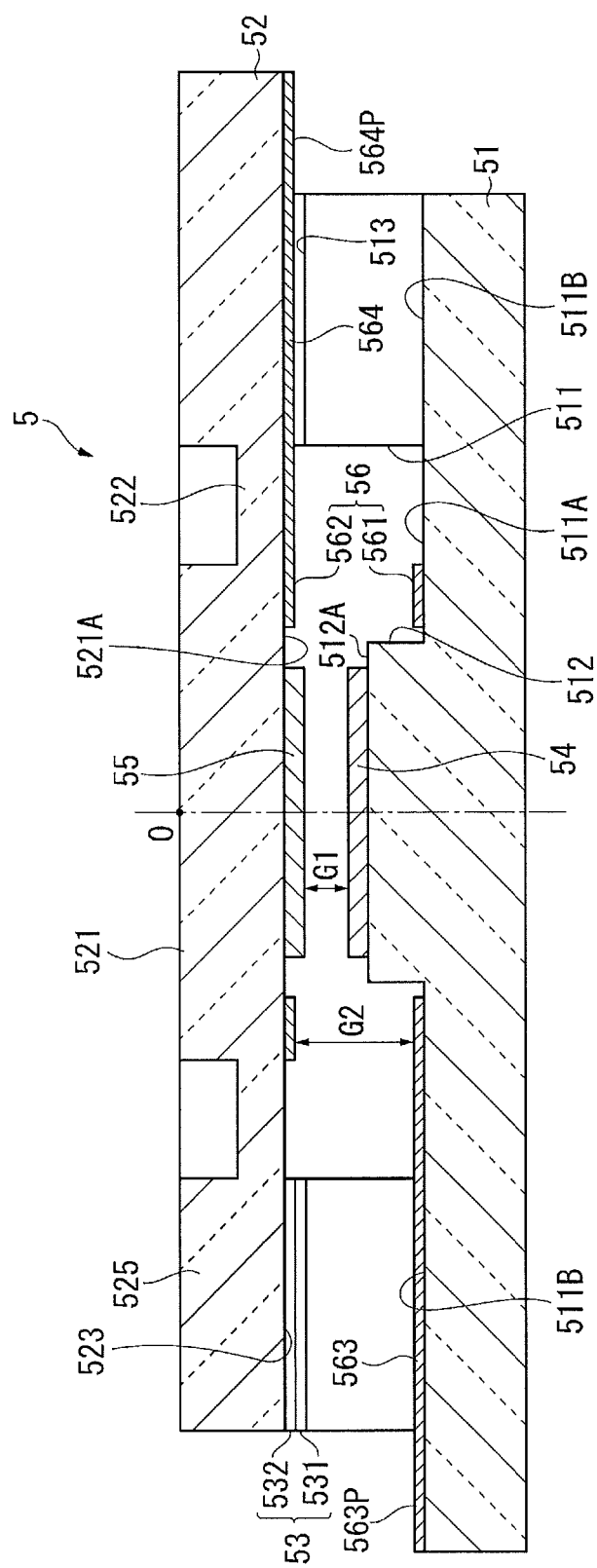
FIG. 4 is a cross-sectional view of the wavelength tunable interference filter taken along the line IV-IV in FIG. 3.

FIG. 3 is a plan view showing a schematic configuration of the wavelength tunable interference filter. FIG. 4 is a cross-sectional view of the wavelength tunable interference filter taken along the line IV-IV in FIG. 3.

The wavelength tunable interference filter 5 is a Fabry-Perot etalon. The wavelength tunable interference filter 5 is, for example, a rectangular-plate-shaped optical member and includes a fixed substrate 51, which is formed to a thickness of, for example, about 500 μm, and a movable substrate 52, which is formed to a thickness of, for example, about 200 μm. Each of the fixed substrate 51 and the movable substrate 52 is made, for example, of soda glass, crystalline glass, quartz glass, lead glass, potassium glass, borosilicate glass, no-alkali glass, or any of a variety of other glass materials or quartz. A first bonding portion 513 of the fixed substrate 51 and a second bonding portion 523 of the movable substrate are bonded to each other via a bonding film 53 (first bonding film 531 and second bonding film 532) formed, for example, of a plasma polymerization film primarily made, for example, of siloxane so that the fixed substrate 51 and the movable substrate 52 are integrated with each other.

The fixed substrate 51 is provided with a fixed reflection film 54, and the movable substrate 52 is provided with a movable reflection film 55. The fixed reflection film 54 and the movable reflection film 55 are so disposed that they face each other via a gap G1. The wavelength tunable interference filter 5 is provided with an electrostatic actuator 56, which is used to adjust (change) the dimension of the gap G1. The electrostatic actuator 56 is formed of a fixed electrode 561 provided on the fixed substrate 51 and a movable electrode 562 provided on the movable substrate 52. The fixed electrode 561 and the movable electrode 562 face each other via a gap G2. The fixed electrode 561 and the movable electrode 562 may be directly provided on substrate surfaces of the fixed substrate 51 and the movable substrate 52 respectively or may be provided thereon via other film members. The gap G2 is greater than the gap G1.

In a filter plan view or FIG. 3 in which the wavelength tunable interference filter 5 is viewed in the substrate thickness direction of the fixed substrate 51 (movable substrate 52), a plan-view center point O of the fixed substrate 51 and the movable substrate 52 coincides with not only the center point of the fixed reflection film 54 and the center point of the movable reflection film 55 but also the center point of a movable portion 521, which will be described later.

In the following description, a plan view viewed in the substrate thickness direction of the fixed substrate 51 or the movable substrate 52, that is, a plan view in which the wavelength tunable interference filter 5 is viewed in the direction in which the fixed substrate 51, the bonding film 53, and the movable substrate 52 are layered on each other is referred to as the filter plan view.

Configuration of Fixed Substrate

The fixed substrate 51 has an electrode placement groove 511 and a reflection film attachment portion 512 formed therein in an etching process. The fixed substrate 51 is formed to be thicker than the movable substrate 52 and is not therefore bent by an electrostatic attractive force produced when a voltage is applied between the fixed electrode 561 and the movable electrode 562 or internal stress induced in the fixed electrode 561.

Further, a cutout 514 is formed at a vertex C1 of the fixed substrate 51 and exposes a movable electrode pad 564P, which will be described later and faces the fixed substrate 51 of the wavelength tunable interference filter 5.

The electrode placement groove 511 is so formed that it has an annular shape around the plan-view center point O of the fixed substrate 51 in the filter plan view. The reflection film attachment portion 512 is so formed that it protrudes from a central portion of the electrode placement groove 511 in the plan view described above toward the movable substrate 52. A groove bottom surface of the electrode placement groove 511 forms an electrode attachment surface 511A, on which the fixed electrode 561 is disposed. Further, the front end surface of the thus protruding reflection film attachment portion 512 forms a reflection film attachment surface 512A.

Further, electrode drawing grooves 511B, which extend from the electrode placement groove 511 toward the vertices C1 and C2 at the outer circumferential edge of the fixed substrate 51, are provided in the fixed substrate 51.

The fixed electrode 561 is disposed on the electrode attachment surface 511A of the electrode placement groove 511. More specifically, the fixed electrode 561 is disposed on the electrode attachment surface 511A in a region facing the movable electrode 562 on the movable portion 521, which will be described later. An insulating film for ensuring insulation between the fixed electrode 561 and the movable electrode 562 may be layered on the fixed electrode 561.

A fixed drawn electrode 563 is provided on the fixed substrate 51 and extends from the outer circumferential edge of the fixed electrode 561 toward the vertex C2. The tip of the thus extending fixed drawn electrode 563 (portion located at vertex C2 of fixed substrate 51) forms a fixed electrode pad 563P, which is connected to the control substrate 124.

The present embodiment has a configuration in which the single fixed electrode 561 is provided on the electrode attachment surface 511A but may instead have, for example, a configuration in which two concentric electrodes formed around the plan-view center point O are provided on the electrode attachment surface 511A (dual electrode configuration).

The reflection film attachment portion 512 is coaxial with the electrode placement groove 511, has a substantially cylindrical shape having a diameter smaller than that of the electrode placement groove 511, and has the reflection film attachment surface 512A facing the movable substrate 52, as described above.

The fixed reflection film 54 is disposed on the reflection film attachment portion 512, as shown in FIG. 4. The fixed reflection film 54 can be formed, for example, of a metal film made, for example, of Ag or an alloy film made, for example, of an Ag alloy. The fixed reflection film 54 may instead be formed of a dielectric multilayer film, for example, having a high refractive layer made of $TiO_2$ and a low refractive layer made of $SiO_2$. The fixed reflection film 54 may still instead be a reflection film formed of a metal film (or alloy film) layered on a dielectric multilayer film, a reflection film formed of a dielectric multilayer film layered on a metal film (or alloy film), or a reflection film that is a laminate of a single-layer refractive layer (made, for example, of $TiO_2$ or $SiO_2$) and a metal film (or alloy film).

An antireflection film may be formed on a light incident surface of the fixed substrate 51 (surface on which fixed reflection film 54 is not provided) in a position corresponding to the fixed reflection film 54. The antireflection film can be formed by alternately layering a low refractive index film and a high refractive index film on each other, and the thus formed antireflection film decreases visible light reflectance of the surface of the fixed substrate 51 whereas increasing visible light transmittance thereof.

Part of the surface of the fixed substrate 51 that faces the movable substrate 52, specifically, the surface where the electrode placement groove 511, the reflection film attachment portion 512, or the electrode drawing groove 511B are not formed in the etching process forms the first bonding portion 513. A first bonding film 531 is provided on the first bonding portion 513 and bonded to a second bonding film 523 provided on the movable substrate 52, whereby the fixed substrate 51 and the movable substrate 52 are bonded to each other as described above.

Configuration of Movable Substrate

The movable substrate 52 has the movable portion 521, which is circular and formed around the plan-view center point O, a holding portion 522, which is coaxial with the movable portion 521 and holds the movable portion 521, and a substrate outer circumferential portion 525, which is provided in a region outside the holding portion 522, in the filter plan view or FIG. 3.

Further, a cutout 524 is formed in correspondence with the vertex C2 of the movable substrate 52 and exposes the fixed electrode pad 563P when the wavelength tunable interference filter 5 is viewed from the side where the movable substrate 52 is present, as shown in FIG. 3.

The movable portion 521 is formed to be thicker than the holding portion 522. In the present embodiment, for example, the movable portion 521 is formed to be as thick as the movable substrate 52. The movable portion 521 is so formed that it has a diameter greater than at least the diameter of the outer circumferential edge of the reflection film attachment surface 512A in the filter plan view. The movable electrode 562 and the movable reflection film 55 are disposed on the movable portion 521.

An antireflection film may be formed on the surface of the movable portion 521 that faces away from the fixed substrate 51, as in the case of the fixed substrate 51. The antireflection film can be formed by alternately layering a low refractive index film and a high refractive index film on each other, and the thus formed antireflection film decreases visible light reflectance of the surface of the movable substrate 52 whereas increasing visible light transmittance thereof.

The movable electrode 562 faces the fixed electrode 561 via the gap G2 and is so formed that it has an annular shape that conforms to the shape of the fixed electrode 561. A movable drawn electrode 564 is provided on the movable substrate 52 and extends from the outer circumferential edge of the movable electrode 562 toward the vertex C1 of the movable substrate 52. The tip of the thus extending movable drawn electrode 564 (portion located at vertex C1 of movable substrate 52) forms the movable electrode pad 564P, which is connected to the control substrate 124.

The movable reflection film 55 is so disposed on a central portion of a movable surface 521A of the movable portion 521 that the movable reflection film 55 faces the fixed reflection film 54 via the gap G1. The movable reflection film 55 has the same configuration as that of the fixed reflection film 54 described above.

In the present embodiment, the dimension of the gap G2 is greater than the dimension of the gap G1 as described above by way of example, but the dimensions of the gaps are not necessarily set this way. For example, when the light under measurement is infrared light or far infrared light, the dimension of the gap G1 may be greater than the dimension of the gap G2 depending on the wavelength region of the light under measurement.

The holding portion 522 is a diaphragm that surrounds the movable portion 521 and is formed to be thinner than the movable portion 521. The thus configured holding portion 522 is more readily bent than the movable portion 521 and can therefore displace the movable portion 521 toward the fixed substrate 51 under a small amount of electrostatic attractive force. Since the movable portion 521 is thicker and therefore more rigid than the holding portion 522, the movable portion 521 is not deformed even when the holding portion 522 is attracted toward the fixed substrate 51 under an electrostatic attractive force. The movable reflection film 55 disposed on the movable portion 521 will therefore not be bent, whereby the fixed reflection film 54 and the movable reflection film 55 can be consistently maintained parallel to each other.

In the present embodiment, the diaphragm-shaped holding portion 522 is presented by way of example, but the holding portion 522 is not necessarily formed of a diaphragm. For example, beam-shaped holding portions disposed at equal angular intervals may be provided around the plan-view center point O.

The substrate outer circumferential portion 525 is disposed in a region outside the holding portion 522 in the filter plan view, as described above. The second bonding portion 523, which faces the first bonding portion 513, is provided on the surface of the substrate outer circumferential portion 525 that faces the fixed substrate 51. A second bonding film 532 is provided on the second bonding portion 523 and bonded to the first bonding film 513, whereby the fixed substrate 51 and the movable substrate 52 are bonded to each other as described above.

Configuration of Imaging Section

The imaging section 123 can, for example, be a CCD, a CMOS, or any other image sensor. The imaging section 123 has a photoelectric element corresponding to each pixel and outputs a spectroscopic image (image signal) formed of pixels showing the amounts of light received with the respective photoelectric elements to the control unit 15.

Configuration of Control Substrate

The control substrate 124 is a circuit substrate that controls the action of the imaging module 12 and is connected to the light incident section 121, the light source section 122, the wavelength tunable interference filter 5, the imaging section 123, and other components. The control substrate 124 controls the action of each of the components connected thereto based on a control signal inputted from the control unit 15. For example, when the user performs zooming operation, the control substrate 124 moves a predetermined lens in the light incident section 121 or changes the aperture diameter of the aperture. Further, when the user performs operation that triggers capture of a spectroscopic image of an object being imaged for composition analysis, the control substrate 124 turns on and off the light sources 122A and 122B in the light source section 122 based on a control signal from the control unit 15. Further, the control substrate 124 applies a predetermined voltage based on a control signal from the control unit 15 to the electrostatic actuator 56 in the wavelength tunable interference filter 5 and outputs a spectroscopic image captured by the imaging section 123 to the control unit 15.

Configuration of Display

The display 13 is so provided that it faces a display window of the enclosure 11. The display 13 may be any display capable of displaying an image, for example, a liquid crystal panel or an organic EL panel.

Further, the display 13 in the present embodiment also serves as a touch panel and hence functions as another operation unit 14.

Configuration of Operation Unit

The operation unit 14 is formed, for example, of a shutter button provided on the enclosure 11 and a touch panel provided on the display 13, as described above. When the user performs input operation, the operation unit 14 outputs an operation signal according to the input operation to the control unit 15. The operation unit 14 does not necessarily have the configuration described above but may have a configuration in which a plurality of operation buttons or any other components are provided in place of the touch panel.

Configuration of Controller

The control unit 15 is, for example, a combination of a CPU, a memory, and other components and controls the overall action of the spectroscopic analysis apparatus 10. The control unit 15 includes a storage section 16 and a computation section 17, as shown in FIG. 2.

The storage section 16 stores an OS for controlling the overall action of the spectroscopic analysis apparatus 10, a program for achieving a variety of functions, and a variety of data. The storage section 16 has a temporal storage area that temporarily stores acquired spectroscopic images, composition analysis results, and other types of information.

An example of the variety of data stored in the storage section 16 is V-λ data representing the wavelength of light allowed to pass through the wavelength tunable interference filter 5 versus a drive voltage applied to the electrostatic actuator 56 in the wavelength tunable interference filter 5.

The storage section 16 further stores correlation data (analytical curve, for example) representing correlation between a characteristic quantity extracted from an absorption spectrum associated with each component of an object under analysis (absorbance at specific wavelength) and the content of the component.

The computation section 17 reads the program stored in the storage section 16 to perform a variety of processes, and the computation section 17 then functions as a light source controller 171, a module controller 172, a pixel detector 173 (pixel detection section), a light amount corrector 174 (light amount correction section), a composition analyzer 175, and a display controller 176.

The light source controller 171 switches drive operation of the light emitters in the light source section 122 from the light emitter 122A1 to the light emitter 122B1 and vice versa.

The module controller 172 refers to the V-λ data and controls the electrostatic actuator 56 to change the wavelength of light allowed to pass through the wavelength tunable interference filter 5. The module controller 172 further controls the imaging section 123 to capture spectroscopic images.

The pixel detector 173 detects an abnormal pixel and a normal pixel that is not an abnormal pixel based on the amount of light at each pixel of each acquired spectroscopic image. An abnormal pixel corresponds to a portion where the light from the light emitter 122A1 or 122B1 is specularly reflected off the surface of the object being imaged X.

The light amount corrector 174 corrects the amount of light at an abnormal pixel in each spectroscopic image.

The composition analyzer 175 calculates an optical spectrum at each pixel based on the spectroscopic image in which the amount of light at an abnormal pixel has been corrected. The composition analyzer 175 further analyzes the composition of the object being imaged X based on the calculated optical spectrum at each pixel and the correlation data stored in the storage section 16.

The display controller 176 operates when the module controller 172 controls the imaging module 12 to acquire a captured image and displays the acquired captured image on the display 13. The display controller 176 further displays the composition analysis result provided by the composition analyzer 175 on the display 13.

Specific processes carried out by the computation section 17 will be described later.

Action of Spectroscopic Analysis Apparatus

The action of the spectroscopic analysis apparatus 10 described above will next be described below with reference to the drawings.

To perform composition analysis by using the spectroscopic analysis apparatus 10 of the present embodiment, an initial process of acquiring a reference amount of received light for absorbance calculation is first carried out. The initial process is, for example, carried out by capturing an image of a reference calibration plate (reference object) having a perfect diffuse reflection surface, such as a white plate, and measuring the amount of received light (reference amount of light) $I_o$ at each wavelength. Specifically, the computation section 17 uses the module controller 172 to successively change the voltage applied to the electrostatic actuator 56 to change the wavelength of the transmitted light, for example, at 10-nm intervals within a predetermined near-infrared wavelength region (700 to 1500 nm, for example). The amount of received light at each of the wavelengths is detected by the imaging section 123 and stored in the storage section 16.

In this process, the computation section 17 may use the amount of received light only at one point on the reference calibration plate as the reference amount of light or may specify a pixel range in each of the spectroscopic images of the reference calibration plate, average the amounts of received light at a predetermined number of pixels or all the pixels in the specified pixel range, and use the average as the reference amount of light.

A description will next be made of a spectroscopic image acquisition process in the entire spectroscopic analysis process using the spectroscopic analysis apparatus 10. In the spectroscopic analysis apparatus 10 in the present embodiment, spectroscopic images to be analyzed are acquired, for example, at 10-nm wavelength intervals within the infrared region, and the composition analyzer 175 analyzes the optical spectrum at each pixel in each of the spectroscopic images to be analyzed and analyzes an absorption spectrum corresponding to a component based on the analyzed optical spectrum to determine the content and other factors of the component contained in the object being imaged. A description will be made of a process of acquiring a spectroscopic image to be analyzed (spectroscopic image processing method) that is carried out before the composition analysis.

Figure 5:
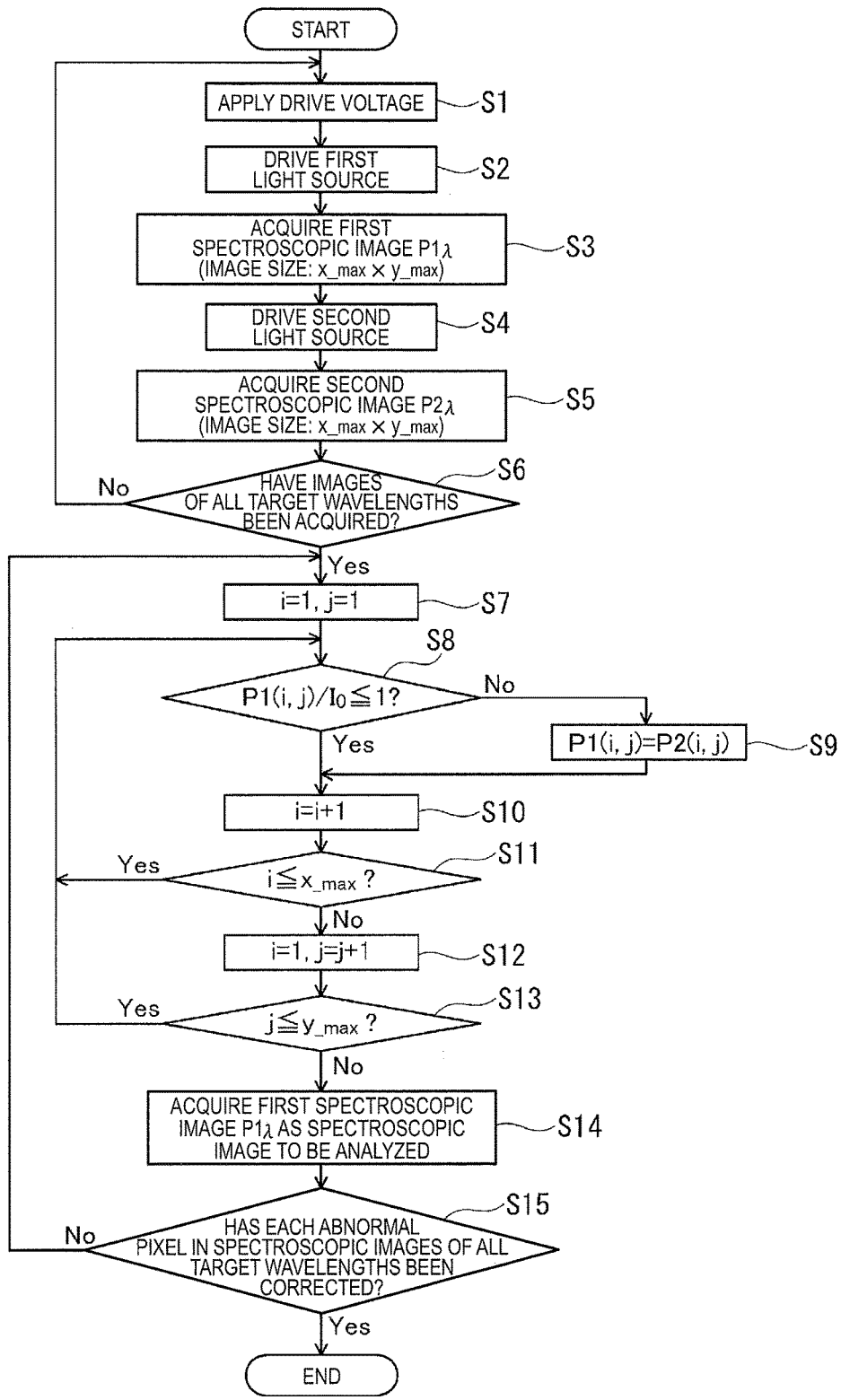
FIG. 5 is a flowchart showing a spectroscopic image acquisition process in the spectroscopic analysis apparatus of the first embodiment.

FIG. 5 is a flowchart of the spectroscopic image acquisition process carried out by the spectroscopic analysis apparatus 10.

Figure 6:
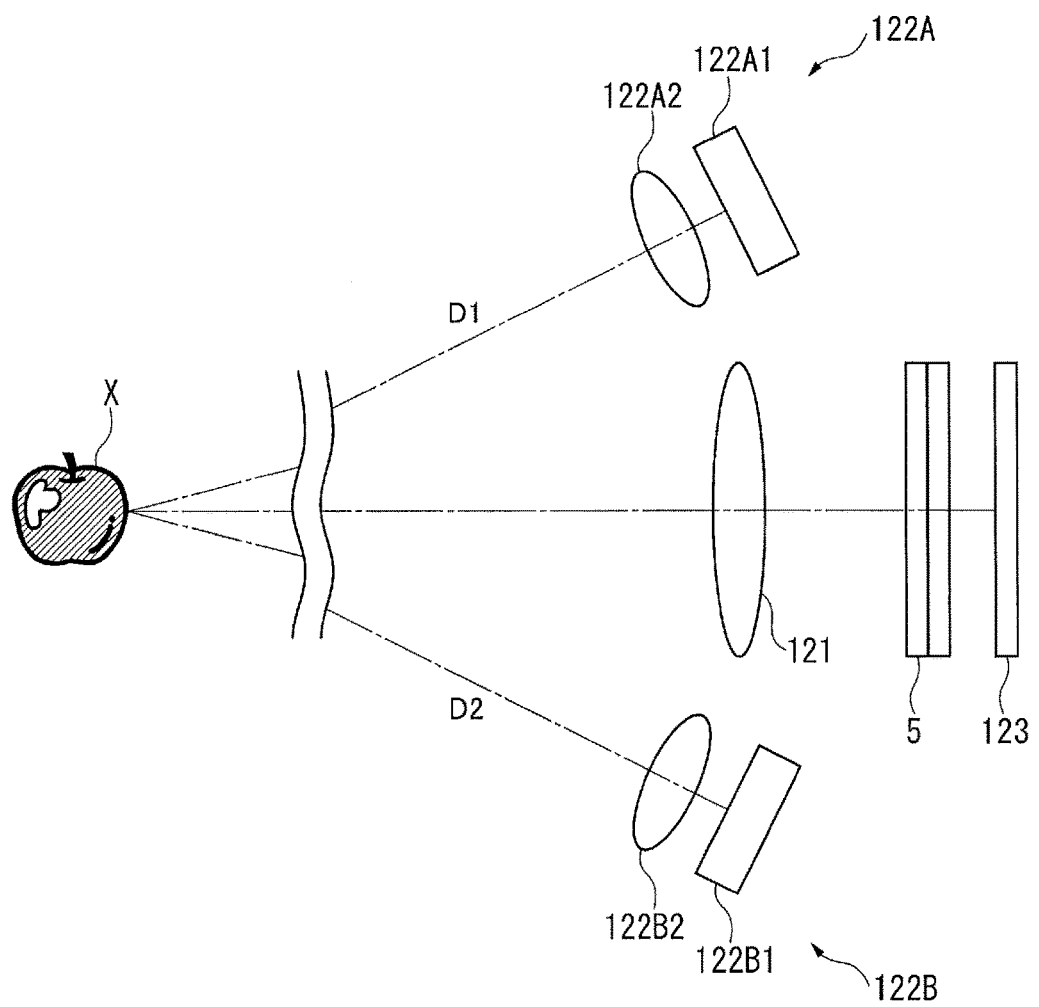
FIG. 6 is a descriptive diagram for describing the spectroscopic image acquisition process of the first embodiment.

FIG. 6 is a descriptive diagram for describing the spectroscopic image acquisition process.

As shown in FIG. 5, in the spectroscopic image acquisition process, the module controller 172 first refers to the V-λ data stored in the storage section 16, reads a drive voltage corresponding to a target wavelength, and outputs a control signal to the control substrate 124 to cause it to apply the drive voltage to the electrostatic actuator 56 (step S1). The dimension of the gap between the reflection films 54 and 55 of the wavelength tunable interference filter 5 is thus changed, and the wavelength tunable interference filter 5 is ready to transmit light of the target wavelength.

The light source controller 171 then outputs a control signal to the control substrate 124 to cause it to turn on the first light source 122A and turn off the second light source 122B (step S2). As a result, the first light source 122A radiates light toward the object being imaged X in the first radiation direction D1, and the light radiated in the first radiation direction D1 is reflected off the object being imaged X. The reflected light then passes through the light incident section 121 and the wavelength tunable interference filter 5 and is received by the imaging section 123, as shown in FIG. 6. The imaging section 123 captures a first spectroscopic image $P1_\lambda$ corresponding to the target wavelength λ and outputs the first spectroscopic image $P1_\lambda$ to the control unit 15 (step S3). In the following description, the captured first spectroscopic image $P1_\lambda$ has an image size x_max× y_max, and a pixel (x,y) in the first spectroscopic image $P1_\lambda$ shows an amount of light P1 (x,y). The acquired first spectroscopic image $P1_\lambda$ is stored in the storage section 16.

Figure 7:
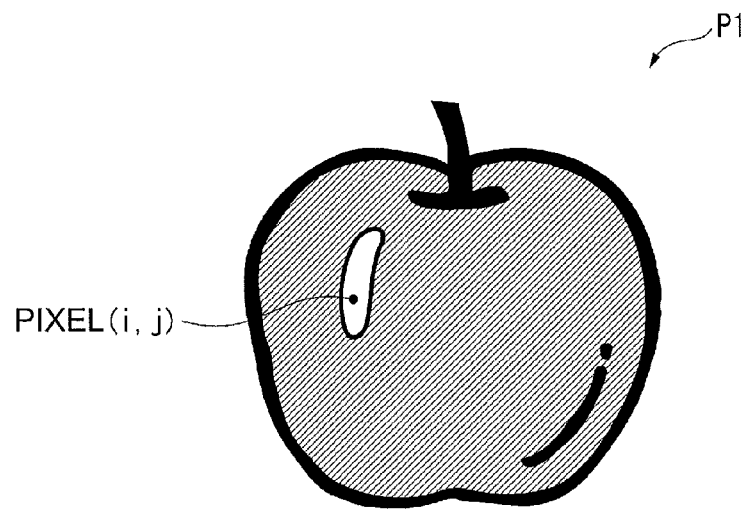
FIG. 7 shows an example of a first spectroscopic image.

FIG. 7 shows an example of the first spectroscopic image $P1_\lambda$.

Part of the light from the first light source 122A is specularly reflected off part of the surface of the object being imaged X and incident on the light incident section 121. The first spectroscopic image $P1_\lambda$ therefore has a pixel that shows an amount of light (brightness) greater than the reference amount of light $I_o$, as shown in FIG. 7.

The light source controller 171 then outputs a control signal to the control substrate 124 to cause it to turn off the first light source 122A and turn on the second light source 122B (step S4). As a result, the second light source 122B radiates light toward the object being imaged X in the second radiation direction D2, and the light radiated in the second radiation direction D2 is reflected off the object being imaged X. The reflected light then passes through the light incident section 121 and the wavelength tunable interference filter 5 and is received by the imaging section 123, as shown in FIG. 6. The imaging section 123 captures a second spectroscopic image $P2_\lambda$ and outputs the second spectroscopic image $P2_\lambda$ to the control unit 15 (step S5).

In the following description, a pixel (x,y) in the acquired second spectroscopic image $P2_\lambda$ shows an amount of light P2 (x,y). The acquired second spectroscopic image $P2_\lambda$ is stored in the storage section 16.

Figure 8:
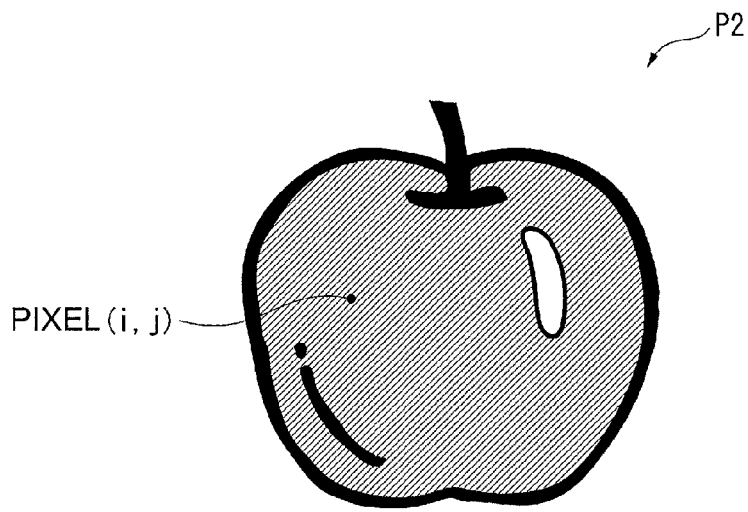
FIG. 8 shows an example of a second spectroscopic image.

FIG. 8 shows an example of the second spectroscopic image $P2_\lambda$.

Part of the light from the second light source 122B is specularly reflected off part of the surface of the object being imaged X and incident on the light incident section 121. In this process, since the second light source 122B radiates light toward the object being imaged X in the radiation direction different from the radiation direction of the light from the first light source 122A, specularly reflection of the light from the second light source 122B on the object being imaged X occurs in a portion different from the portion where the specularly reflection of the light from the first light source 122A occurs. Therefore, in the second spectroscopic image $P2_\lambda$ a pixel that shows an amount of light (brightness) greater than the reference amount of light $I_o$ is located in a position different from the position where the brighter pixel is located in the first spectroscopic image $P1_\lambda$ as shown in FIG. 8.

The module controller 172 then judges whether or not any spectroscopic image that has not been acquired is left (step S6). When it is judged in step S6 that a spectroscopic image that has not been acquired is left, the control returns to step S1 and the spectroscopic image acquisition process is continued. The target wavelength at which a spectroscopic image is acquired (wavelength corresponding to drive voltage set in step S1) may be set, for example, in accordance with a component to be analyzed by the spectroscopic analysis apparatus 10 or may be set by an operator who performs the measurement as appropriate. For example, to detect the amounts and calories of lipid, glucide, protein, and water contained in a food product by using the spectroscopic analysis apparatus, a wavelength at which a characteristic quantity of each of at least the lipid, glucide, protein, and water is obtained may be set as the target wavelength, and it may be judged in step S6 whether or not a spectroscopic image of each of the target wavelengths has been acquired.

Spectroscopic images may instead be successively acquired at predetermined wavelength intervals (10-nm intervals, for example).

When it is judged in step S6 that spectroscopic images (first spectroscopic image $P1_\lambda$ and second spectroscopic image $P2_\lambda$) of all the target wavelength have been acquired, a process of correcting an abnormal pixel in the spectroscopic images is carried out.

To this end, the pixel detector 173 first initializes setting variables i and j for setting a pixel position on the object under detection (i=1, j=1) (step S7).

The pixel detector 173 then calculates the ratio of the amount of light P1 (i,j) at a pixel (i,j) in the first spectroscopic image $P1_\lambda$ to the reference amount of light $I_o$ (reflectance ratio) and judges whether or not the reflection ratio is smaller than or equal to 1 (step S8). That is, it is judged whether or not the amount of light P1 (i,j) is smaller than or equal to the reference amount of light $I_o$. To calculate the reflectance ratio for a first spectroscopic image of a wavelength A, the reference amount of light $I_o$ at the wavelength A is used.

When P1 (i,j)/$I_o$≤1 in step S8, it is judged that the pixel (i,j) is a "normal pixel," which is not a pixel that corresponds to the specular reflection portion.

On the other hand, when P1 (i,j)/$I_o$>1 in step S8, it is judged that the pixel (i,j) is an "abnormal pixel," which is a pixel that corresponds to the specular reflection portion.

When the pixel detector 173 judges in step S8 that the pixel (i,j) in the first spectroscopic image $P1_\lambda$ is an abnormal pixel, the light amount corrector 174 replaces the amount of light P1 (i,j) at the pixel (i,j) in the first spectroscopic image $P1_\lambda$ with the amount of light P2 (i,j) at the pixel (i,j) in the second spectroscopic image $P2_\lambda$ (step S9).

When the pixel (i,j) is judged to be a normal pixel in step S8 (when judged to be "Yes"), or after the amount of light is replaced in step S9, the pixel detector 173 adds 1 to the setting variable i (step S10: i=i+1) and judges whether or not the x coordinate in the image that is specified by the setting variable i falls within the image size (i≤x_max) (step S11).

When it is judged to be "Yes" in step S11, the control returns to step S8.

On the other hand, when it is judged to be "No" in step S11, the pixel detector 173 adds 1 to the setting variable j (step S12: j=j+1) and judges whether or not the y coordinate in the image that is specified by the setting variable j falls within the image size (j≤y_max) (step S13).

When it is judged to be "Yes" in step S13, the control returns to step S8.

On the other hand, when it is judged to be "No" in step S13, the computation section 17 stores the first spectroscopic image $P1_\lambda$ in which the amounts of light at all the abnormal pixels have been corrected in the processes in steps S8 to S13 as a spectroscopic image to be analyzed in the storage section 16 (step S14).

Figure 9:
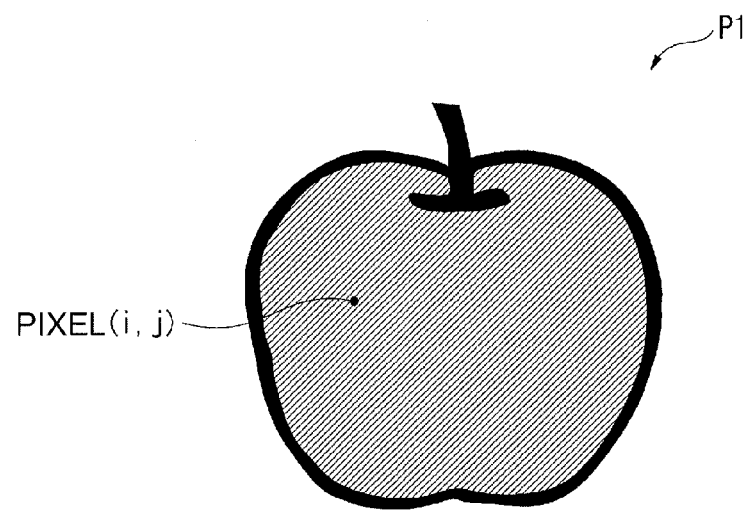
FIG. 9 shows an example of a first spectroscopic image in which the amount of light has been corrected.

FIG. 9 shows an example of the first spectroscopic image $P1_\lambda$ acquired as a spectroscopic image to be analyzed. As shown in FIG. 9, the amount of light at each abnormal pixel is replaced with the amount of light at the corresponding pixel (normal pixel) in the second spectroscopic image by carrying out the processes in steps S8 to S13.

It is then judged whether or not the amount of light at each abnormal pixel in the first spectroscopic image $P1_\lambda$ has been corrected for all the target wavelengths λ (step S15). When it is judged to be "No" in step S15, the pixel detector 173 selects spectroscopic images $P1_\lambda$ and $P2_\lambda$ of a target wavelength that have not undergone the correction of the amount of light at an abnormal pixel, and the control returns to the process in step S7.

On the other hand, when it is judged to be "Yes" in the process in step S15, a spectroscopic image to be analyzed in which the amount of light at each abnormal pixel has been corrected has been acquired for each of the target wavelengths λ. The spectroscopic image acquisition process is then terminated.

Advantageous Effects in First Embodiment

In the present embodiment, the first radiation direction D1 of the light radiated from the first light source 122A differs from the second radiation direction D2 of the light radiated from the second light source 122B. As a result, on the surface of the object being imaged X, a portion that specularly reflects the light traveling in the first radiation direction D1 and directs the light toward the light incident section 121 differs from a portion that specularly reflects the light traveling in the second radiation direction D2 and directs the light toward the light incident section 121.

Further, in the present embodiment, the following two spectroscopic images are acquired: the first spectroscopic image $P1_\lambda$ based on the light that has traveled in the first radiation direction D1, has passed through the wavelength tunable interference filter 5, and has been received and captured by the imaging section 123; and the second spectroscopic image $P2_\lambda$ based on the light that has traveled in the second radiation direction D2, has passed through the wavelength tunable interference filter 5, and has been received and captured by the imaging section 123. The pixel detector 173 then calculates the reflectance ratio based on the amount of light at each pixel in the first spectroscopic image $P1_\lambda$ and the reference amount of light $I_o$ and detects a pixel (i,j) showing a reflectance ratio greater than 1 as an abnormal pixel, and the light amount corrector 174 replaces the amount of light at the pixel (i,j) having been detected as an abnormal pixel with the amount of light at the pixel (i,j) in the second spectroscopic image $P2_\lambda$.

Therefore, in the present embodiment, the amount of light at the abnormal pixel (i,j) in the first spectroscopic image can be replaced with the amount of light at a normal pixel, and a more precise spectroscopic image (spectroscopic image to be analyzed) can be acquired. Further, since the thus acquired spectroscopic image to be analyzed contains no abnormal pixel showing an amount of light higher than the reference amount of light, an optical spectrum at each pixel in the spectroscopic image at each wavelength can be precisely calculated, whereby composition analysis of the object being imaged X can be precisely performed.

In the present embodiment, the light source section 122 includes the first light source 122A and the second light source 122B, which radiate light fluxes that travel in the radiation directions D1 and D2 different from each other.

Therefore, alternately driving the first light source 122A and the second light source 122B readily allows an object being imaged to be irradiated with the light fluxes traveling in the different radiation directions.

Second Embodiment

A second embodiment according to the invention will next be described with reference to the drawings.

In the first embodiment described above, the following case is presented by way of example: When a pixel (i,j) in the first spectroscopic image $P1_\lambda$ is judged to be a normal pixel, the amount of light at the pixel is maintained. The second embodiment differs from the first embodiment described above in that when a pixel (i,j) in the first spectroscopic image $P1_\lambda$ is judged to be a normal pixel, the amount of light at the pixel is corrected based on the pixel (i,j) in the second spectroscopic image $P2_\lambda$.

Figure 10:
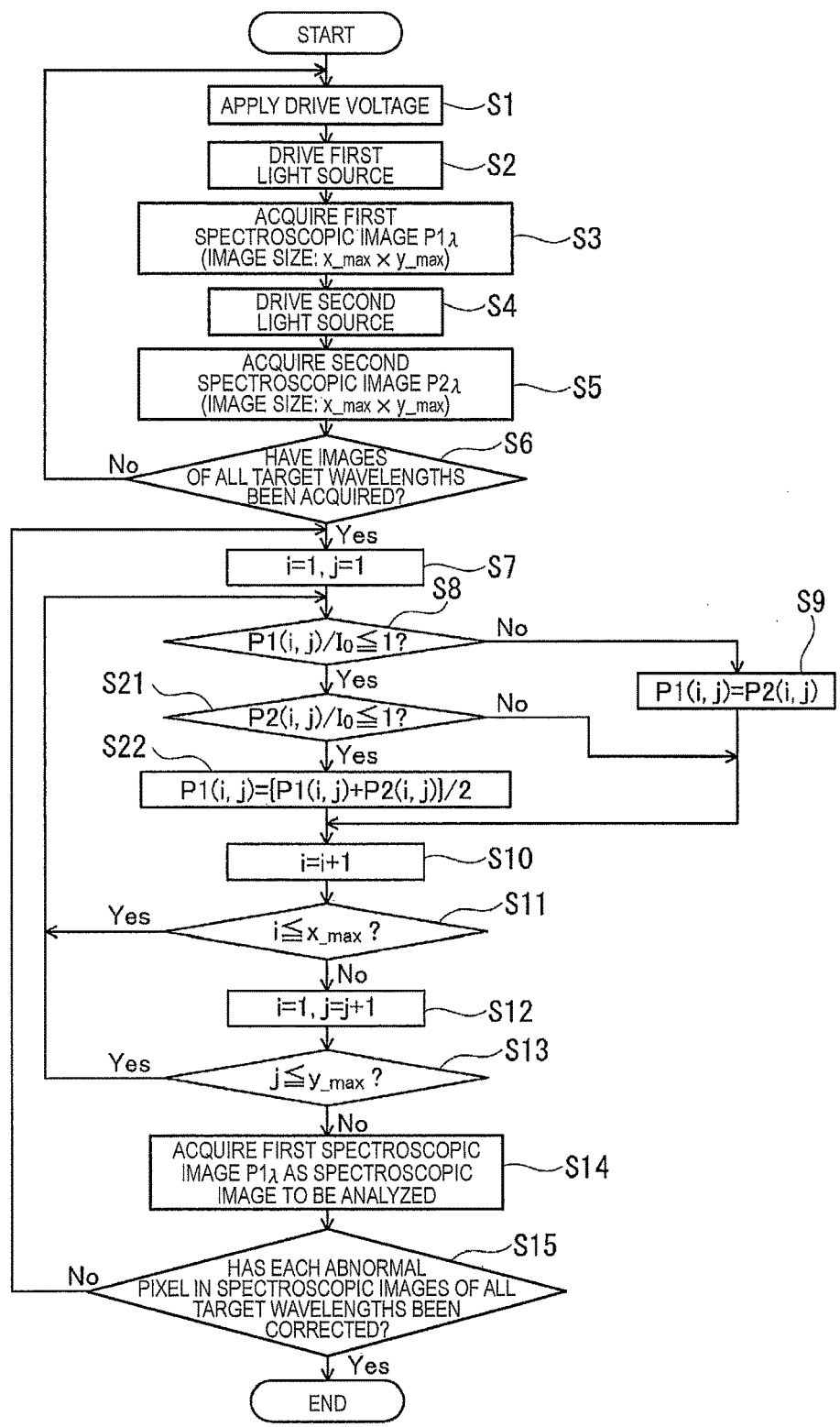
FIG. 10 is a flowchart showing a spectroscopic image acquisition process in a second embodiment.

FIG. 10 is a flowchart showing a spectroscopic image acquisition process (spectroscopic image processing method) in the second embodiment. In the following description, the same configurations as those in the first embodiment and the items having already been described have the same reference characters and will not be described or described in a simplified manner.

In the present embodiment, the processes in steps S1 to S6 are carried out to acquire a first spectroscopic image $P1_\lambda$ and a second spectroscopic image $P2_\lambda$ as in the first embodiment, as shown in FIG. 10.

Further, step S7 is carried out to initialize the setting variables i and j, and then the pixel detector 173 carries out step S8 to judge whether or not a pixel (i,j) in the first spectroscopic image $P1_\lambda$ is an abnormal pixel. When the pixel (i,j) is an abnormal pixel, step S9 is carried out to replace the amount of light at the abnormal pixel with the amount of light at the pixel (i,j) in the second spectroscopic image $P2_\lambda$, as in the first embodiment.

On the other hand, when the pixel (i,j) is judged to be a normal pixel (having a reflectance ratio smaller than or equal to 1) in step S8, the pixel detector 173 further judges whether or not the pixel (i,j) in the second spectroscopic image $P2_\lambda$ is an abnormal pixel. That is, the pixel detector 173 judges whether or not $P2(i,j)/I_o \le 1$ (step S21).

When the pixel (i,j) in the second spectroscopic image $P2_\lambda$ is an abnormal pixel (step S21: "No"), the light amount corrector 174 uses the amount of light P1 (i,j) at the pixel (i,j) in the first spectroscopic image $P1_\lambda$ as it is, as in the first embodiment.

On the other hand, when the pixel (i,j) in the second spectroscopic image $P2_\lambda$ is a normal pixel in step S21 (step S21: "Yes"), the light amount corrector 174 calculates the average of the amount of light P1 (i,j) in the first spectroscopic image $P1_\lambda$ and the amount of light P2 (i,j) in the second spectroscopic image $P2_\lambda$ (average amount of light). The light amount corrector 174 then replaces the amount of light at the pixel (i,j) in the first spectroscopic image $P1_\lambda$ with the calculated average amount of light (step S22).

The same processes as those in the first embodiment are carried out afterwards.

Advantageous Effects in Second Embodiment

In the present embodiment, when a pixel (i,j) in the first spectroscopic image $P1_\lambda$ and a pixel (i,j) in the second spectroscopic image $P2_\lambda$ are both normal pixels, the light amount corrector calculates the average of the amounts of light at the pixels (i,j) and replaces the amount of light at the pixel (i,j) in the first spectroscopic image $P1_\lambda$ with the average amount of light.

A more precise amount of light based on two spectroscopic images can therefore be used, whereby a more precise spectroscopic image can be acquired.

Third Embodiment

A third embodiment according to the invention will next be described with reference to the drawings.

The first and second embodiments described above have shown the case where the two light sources 122A and 122B are provided and radiate light fluxes in the radiation directions D1 and D2 different from each other toward the object being imaged X. The present embodiment differs from the embodiments described above in that light from a single light source is used and the radiation direction (optical axis direction) of the light is so changed that the position where specular reflection occurs on the object being imaged X is changed.

Figure 11:
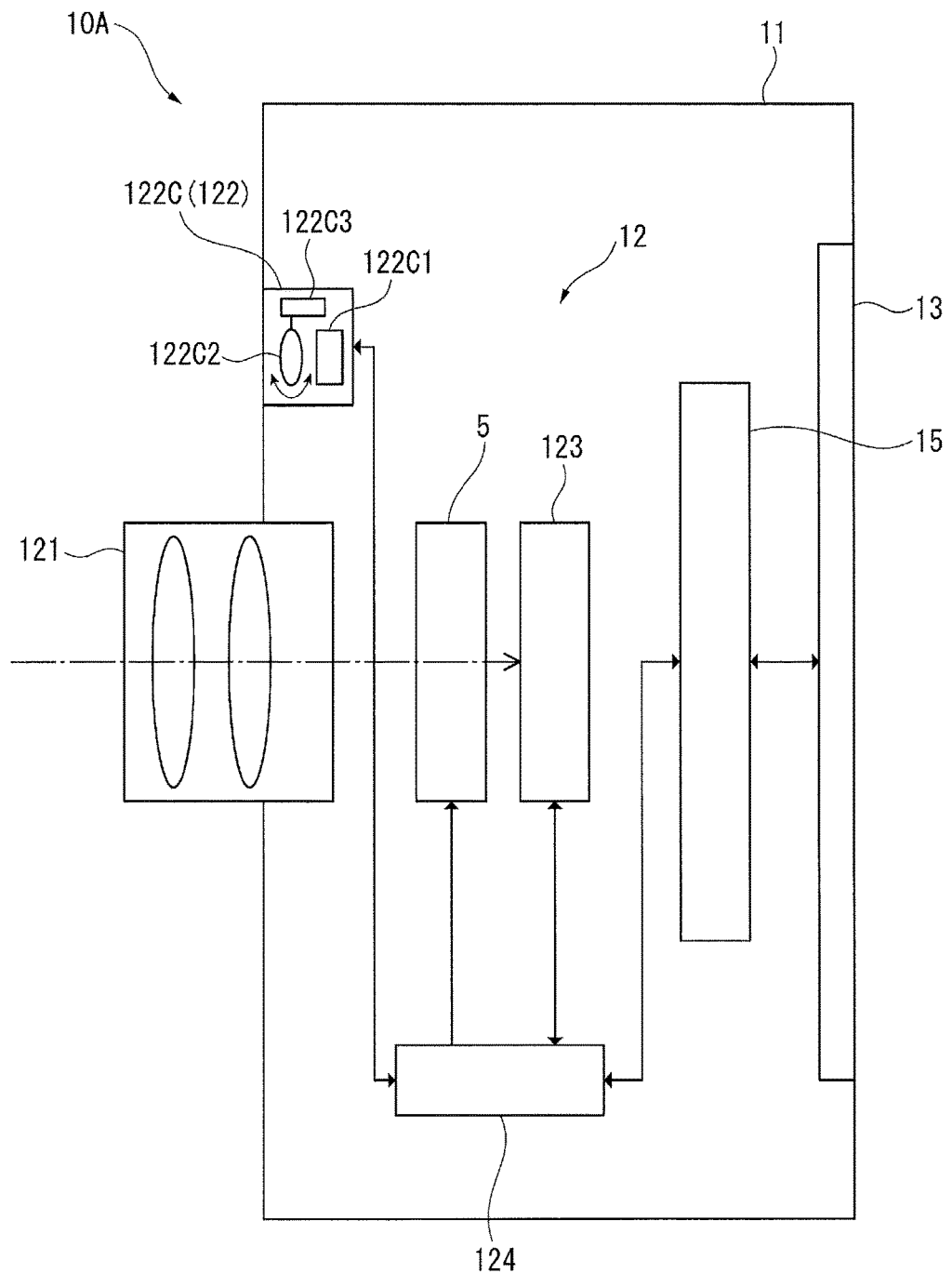
FIG. 11 shows a schematic configuration of a spectroscopic analysis apparatus of a third embodiment.

FIG. 11 shows a schematic configuration of a spectroscopic analysis apparatus 10A of the third embodiment.

The spectroscopic analysis apparatus 10A of the present embodiment includes a single light source section 122C, which includes a light emitter 122C1, a lens 122C2, and a lens angle changer 122C3 (direction changer), which changes the attitude of the lens 122C2, as shown in FIG. 11.

Figure 12A:
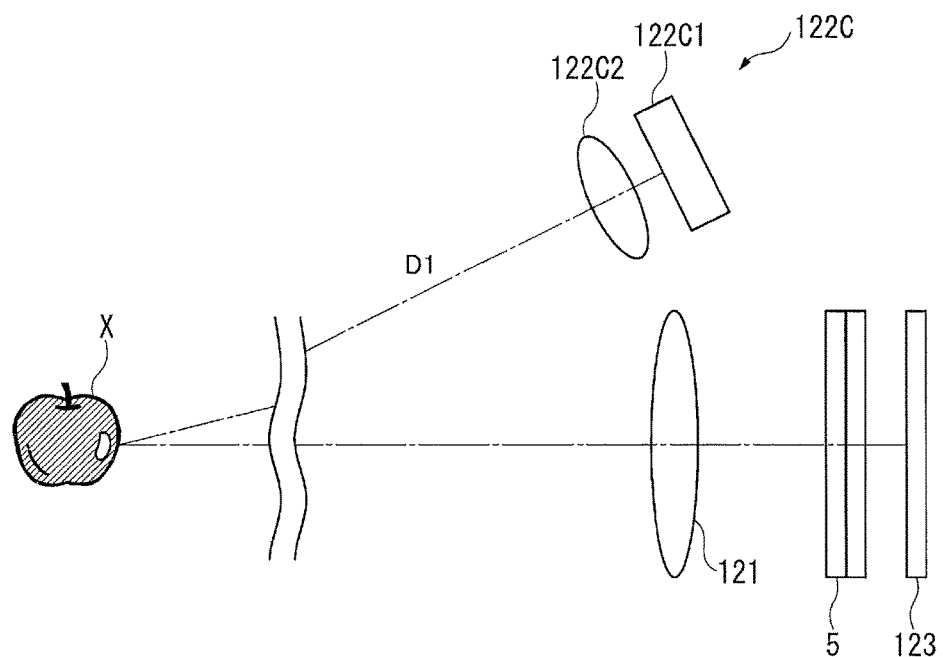
FIGS. 12A and 12B describe light radiated from a light source in the third embodiment.
Figure 12B:
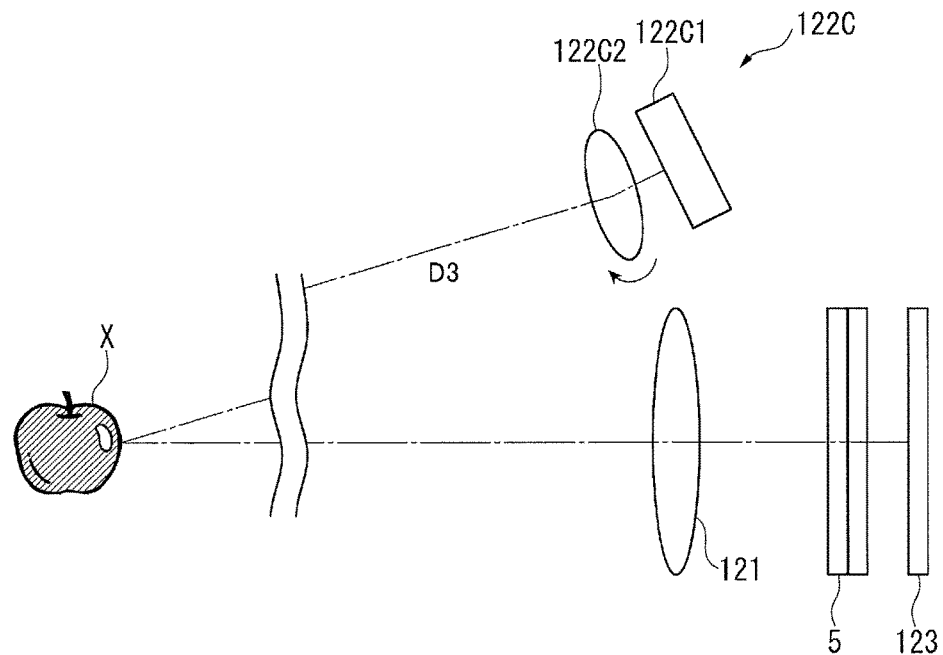

FIGS. 12A and 12B describe the light radiated from the light source section 122C in the third embodiment.

In the present embodiment, in the process in step S2 in the first or second embodiment described above, the light source controller 171 controls the lens angle changer 122C3 to cause the light emitted from the light emitter 122C1 to travel in the first radiation direction D1, as shown in FIG. 12A.

On the other hand, in the process in step S4, the light source controller 171 controls the lens angle changer 122C3 to cause the lens 122C2 to pivot by a predetermined angle. The light emitted from the light emitter 122C1 is therefore directed in a third radiation direction D3, which differs from the first radiation direction D1.

As a result, the optical axis in step S2 and the optical axis in step S4 differ from each other, and specular reflection portions are produced in positions different from each other on the surface of the object being imaged X, as shown in FIGS. 12A and 12B.

Therefore, the positions of abnormal pixels corresponding to the specular reflection portions differ from each other in a first spectroscopic image $P1_\lambda$ and a second spectroscopic image $P2_\lambda$, and a precise spectroscopic image can be acquired by replacing the amount of light at the abnormal pixel (i,j) in the first spectroscopic image $P1_\lambda$ with the amount of light at the pixel (i,j) in the second spectroscopic image $P2_\lambda$, as in the first and second embodiments described above.

Advantageous Effects in Third Embodiment

In the present embodiment, the single light source section 122C is provided and so configured that the lens angle changer 122C3 can change the angle of the attitude of the lens 122C2 to change the radiation direction of the light emitted from the light emitter 122C1.

In the configuration described above, a specular reflection portion produced on the surface of the object being imaged X when a first spectroscopic image $P1_\lambda$ is acquired can be different from a specular reflection portion produced on the surface of the object being imaged X when a second spectroscopic image $P2_\lambda$ is acquired. As a result, the acquired first spectroscopic image $P1_\lambda$ and second spectroscopic image $P2_\lambda$ have abnormal pixels corresponding to the specular reflection portions and located in pixel positions different from each other, and a precise spectroscopic image can be acquired by replacing the amount of light at the abnormal pixel in the first spectroscopic image $P1_\lambda$ with the amount of light at a normal pixel in the second spectroscopic image $P2_\lambda$, as in the first and second embodiments described above.

Further, the present embodiment does not require a plurality of light sources but only requires a single light source to acquire a plurality of spectroscopic images in which specular reflection portions are located in different positions, whereby the configuration can be simplified.

Moreover, the lens angle changer 122C3 allows radiation of the light in still another radiation direction by changing the angle of the lens 122C2, whereby three or more spectroscopic images in which specular reflection portions are located in different positions can be acquired. Therefore, for example, even when an abnormal pixel in a first spectroscopic image $P1_\lambda$ and an abnormal pixel in a second spectroscopic image $P2_\lambda$ are located in the same pixel position, a third spectroscopic image can be acquired by radiating the light in the still another radiation direction, and the abnormal pixel in the first spectroscopic image $P1_\lambda$ can be corrected based on the amount of light at the corresponding pixel in the third spectroscopic image.

Fourth Embodiment

A spectroscopic measurement apparatus of a fourth embodiment according to the invention will next be described with reference to the drawings.

The first to third embodiments described above show the case where the object being imaged X is so irradiated with light in different radiation directions other that spectroscopic images in which specular reflection portions are located in different positions are acquired. The present embodiment differs from the embodiments described above in that the object being imaged X is irradiated with light in a single radiation direction and images of the object being imaged X are captured in different directions for acquisition of spectroscopic images in which specular reflection portions are located in different positions.

Figure 13:
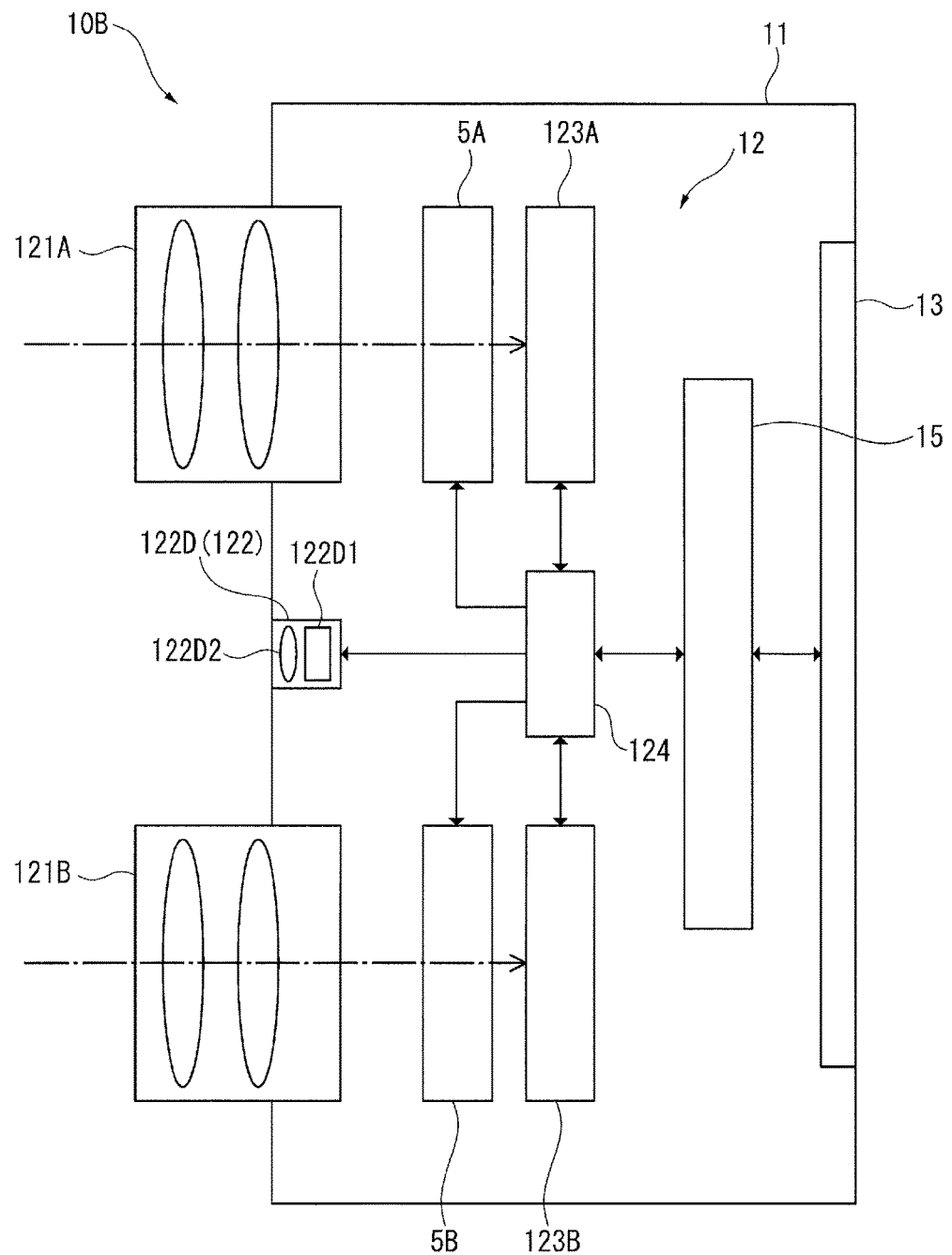
FIG. 13 shows a schematic configuration of a spectroscopic analysis apparatus of a fourth embodiment.

FIG. 13 shows a schematic configuration of a spectroscopic analysis apparatus 10B in the fourth embodiment.

The spectroscopic analysis apparatus 10B of the present embodiment includes two light incident sections 121A and 121B, two wavelength tunable interference filters 5A and 5B (the first spectroscopic device and the second spectroscopic device according to an embodiment of the invention), and two imaging sections 123A and 123B (the first imaging section and the second imaging section according to an embodiment of the invention), as shown in FIG. 13. The spectroscopic analysis apparatus 10B of the present embodiment further includes a light source section 122D provided in a position between the light incident sections 121A and 121B.

The light source section 122D is formed of a light emitter 122D1 and a lens 122D2, as in the case of the first light source 122A and the second light source 122B in the first embodiment.

Further, the light incident sections 121A and 121B, the wavelength tunable interference filters 5A and 5B, and the imaging sections 123A and 123B are configured in the same manner as the light incident section 121, the wavelength tunable interference filter 5, and the imaging section 123 in the first embodiment described above and will not therefore be described.

A spectroscopic image acquisition process In the present embodiment is carried out as follows.

Figure 14:
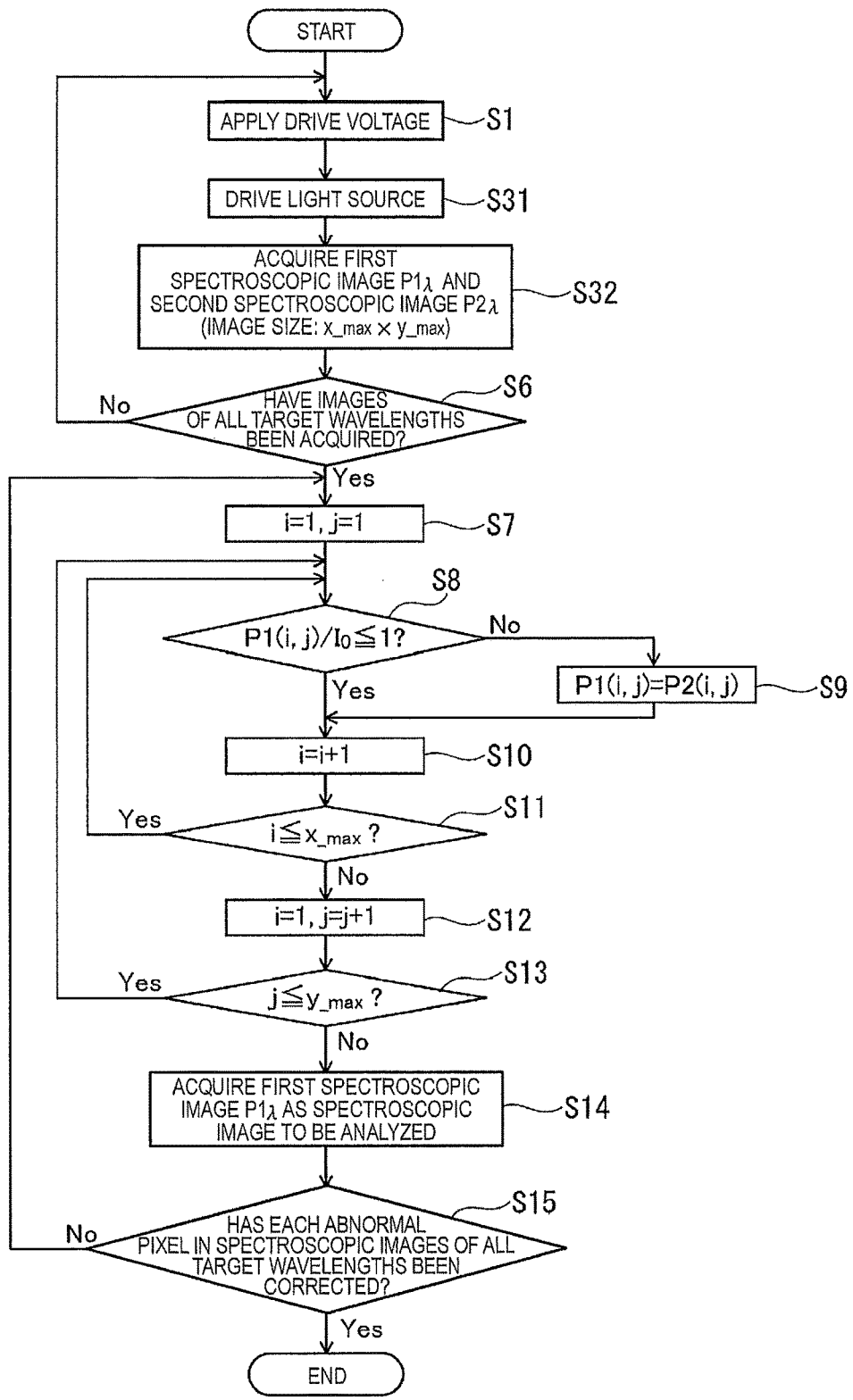
FIG. 14 is a flowchart showing a spectroscopic image acquisition process in the fourth embodiment.

FIG. 14 is a flowchart showing the spectroscopic image acquisition process (spectroscopic image processing method) in the present embodiment.

In the spectroscopic image acquisition process in the present embodiment, the process in step S1 is first carried out, as in the first embodiment. In step S1, the control substrate 124 controls the electrostatic actuator 56 in such a way that the wavelength tunable interference filters 5A and 5B transmit light fluxes of the same target wavelength.

The light source controller 171 then drives the light source section 122D to radiate light toward the object being imaged X (step S31).

Figure 15:
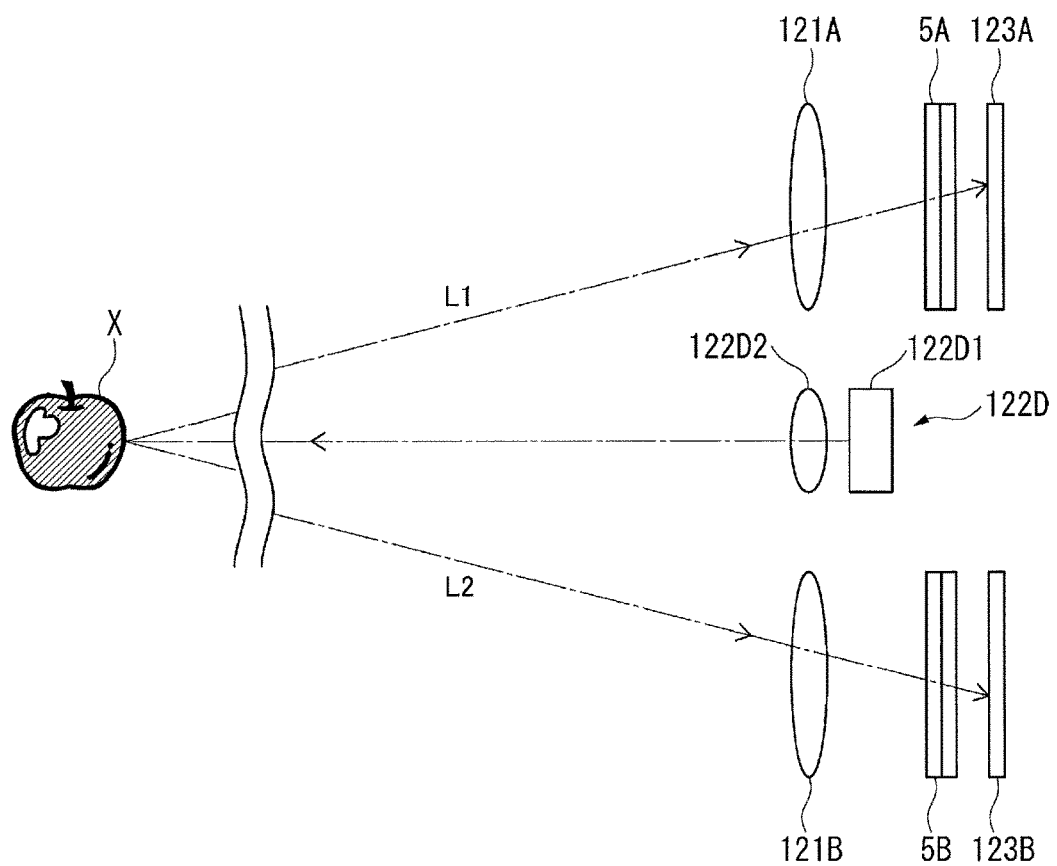
FIG. 15 is a descriptive diagram for describing the spectroscopic image acquisition process in the fourth embodiment.

FIG. 15 is a descriptive diagram for describing the spectroscopic image acquisition process in the present embodiment.

In step S31, light reflected off the surface of the object being imaged X in a first direction L1 is incident on the light incident section 121A, passes through the wavelength tunable interference filter 5A, and is received by the imaging section 123A, as shown in FIG. 15. Further, light reflected off the surface of the object being imaged X in a second direction L2 is incident on the light incident section 121B, passes through the wavelength tunable interference filter 5B, and is received by the imaging section 123B.

As a result, the imaging section 123A and the imaging section 123B capture a first spectroscopic image $P1_\lambda$ and a second spectroscopic image $P2_\lambda$, respectively, which are outputted to the control unit 15 (step S32).

The following processes are the same as those in steps S6 to S15 in the first or second embodiment.

Advantageous Effects in Fourth Embodiment

In the present embodiment, based on a first spectroscopic image $P1_\lambda$ corresponding to the light reflected off the object being imaged X in the first direction L1 and a second spectroscopic image $P2_\lambda$ corresponding to the light reflected off the object being imaged X in the second direction L2, the amount of light at an abnormal pixel in the first spectroscopic image $P1_\lambda$ is corrected.

Since the position of a specular reflection portion on the object being imaged X viewed in a direction differs from the position of the specular reflection portion on the object being imaged X viewed in a different direction, the pixel position of the abnormal pixel in the first spectroscopic image $P1_\lambda$ differs from the pixel position of the abnormal pixel in the second spectroscopic image $P2_\lambda$ also in the present embodiment. Therefore, when a pixel (i,j) in the first spectroscopic image $P1_\lambda$ is an abnormal pixel, the pixel (i,j) in the second spectroscopic image $P2_\lambda$ is a normal pixel, and a precise spectroscopic image can be acquired by replacing the amount of light at the abnormal pixel (i,j) in the first spectroscopic image with the amount of light at the normal pixel.

In the present embodiment, since a first spectroscopic image $P1_\lambda$ and a second spectroscopic image $P2_\lambda$ are captured in different image capturing directions, the pixel positions in the spectroscopic images are shifted from each other in some cases. In this case, a process of aligning the pixel positions in the first spectroscopic image $P1_\lambda$ and the second spectroscopic image $P2_\lambda$ with each other may be carried out. The alignment process can, for example, include calculating the difference in the amount of light between pixels adjacent to each other in each of the spectroscopic images $P1_\lambda$ and $P2_\lambda$ to detect an edge and aligning the pixel positions in such a way that the edges coincide with each other. Performing the alignment described above allows acquisition of a more precise spectroscopic image.

Other Embodiments

The invention is not limited to the embodiments described above, and variations, modifications, and other improvements to the extent that the advantage of the invention is achieved fall within the scope of the invention.

For example, in the embodiments described above, the spectroscopic analysis apparatus 10, 10A, and 10B are presented by way of example. The invention is also applicable to a typical spectroscopic camera that is not intended for composition analysis or other types of analysis of an object being imaged.

Further, each of the embodiments described above shows the case where based on two spectroscopic images, a first spectroscopic image $P1_\lambda$ and a second spectroscopic image $P2_\lambda$, an abnormal pixel in the first spectroscopic image $P1_\lambda$ is corrected, but an abnormal pixel is not necessarily corrected this way.

For example, the amount of light at an abnormal pixel in a first spectroscopic image $P1_\lambda$ may be corrected by using three or more spectroscopic images. Further, even when the pixels (i,j) in the same position in two spectroscopic images are abnormal pixels, using three or more spectroscopic images allows correction of the amount of light at each of the abnormal pixels based on a spectroscopic image in which the pixel (i,j) is a normal pixel. Moreover, when an average amount of light is used as the amount of light at a normal pixel, as in the second embodiment, using an average amount of light based on three or more spectroscopic images allows acquisition of a spectroscopic image in which the normal pixel has a more accurate amount of light.

Further, when pixels (i,j) in the same position in two spectroscopic images are abnormal pixels, the amount of each of the abnormal pixels may be corrected based on the amounts of light of pixels around the pixel (i,j).

In this case, for example, a pixel area around the pixel (i,j) in the first spectroscopic image $P1_\lambda$ is so selected that the pixel area has a predetermined range (i−m1, j−n1)×(i+m1, j+n1), and the average of the amounts of light at normal pixels in the pixel area. Replacing the amount of light at the abnormal pixel with the average allows the amount of light at the abnormal pixel to approach an appropriate value in a precise manner.

In this case, when a plurality of abnormal pixels are present in the pixel area in the first spectroscopic image $P1_\lambda$, and some of the corresponding pixels in the second spectroscopic image $P2_\lambda$ are normal pixels, the amount of light at each of the abnormal pixels corresponding to the normal pixels may be replaced with the amount of light at the corresponding pixel (normal pixel) in the second spectroscopic image $P2_\lambda$, and the average amount of light described above may then be calculated. As a result, the number of abnormal pixels can be reduced, and the amount of light at each of the abnormal pixels can be corrected (replaced) with a more precise amount of light.

Further, the average amount of light may be replaced, for example, with a median value or an average within a quartile range.

The third embodiment shows the case where the radiation direction of the light from the light source section 122C is changed by using the lens angle changer 122C3 to change the angle of the lens 122C2, but the radiation direction is not necessarily changed this way. For example, the radiation direction may be changed based on a configuration in which the angle of the entire light source section 122C is changed or a configuration in which the angle of the attitude of the light emitter 122C1 is changed.

In the embodiments described above, each of the wavelength tunable interference filters 5, 5A, and 5B may be accommodated in a package, and the packaged wavelength tunable interference filter may be incorporated in the corresponding one of the spectroscopic analysis apparatus 10, 10A, and 10B.

In this case, the package can be exhausted to a vacuum and sealed to improve the response of the electrostatic actuator 56 in each of the wavelength tunable interference filters 5, 5A, and 5B when the electrostatic actuator 56 is driven by voltage application.

In each of the embodiments described above, after the reference calibration plate having a perfect diffuse reflection surface is irradiated with light, the amount of light received from the reference calibration plate is used as the reference amount of light $I°$, and the pixel detector 173 calculates the reflectance ratio based on the reference amount of light $I_o$. Instead, for example, a reference calibration plate that absorbs part of light incident on the surface thereof and hence does not provide perfect diffuse reflection may be used. In this case, the pixel detector 173 can judge whether or not a pixel in question is an abnormal pixel by judging whether or not the reflectance ratio is smaller than or equal to a predetermined value smaller than to 1.

The wavelength tunable interference filter 5 is configured to include the electrostatic actuator 56, which changes the dimension of the gap between the reflection films 54 and 55 based on voltage application, but the dimension of the gap is not necessarily changed this way.

For example, a induction actuator having a first induction coil provided in place of the fixed electrode 561 and a second induction coil or a permanent magnet provided in place of the movable electrode 562 may be used.

Further, a piezoelectric actuator may be used in place of the electrostatic actuator 56. In this case, for example, a lower electrode layer, a piezoelectric film, and an upper electrode layer are layered on each other and disposed at the holding portion 522, and a voltage applied between the lower electrode layer and the upper electrode layer can be changed as an input value to expand or contract the piezoelectric film so as to bend the holding portion 522.

Further, each of the embodiments described above shows the case where the wavelength tunable interference filter 5 is configured as a Fabry-Perot etalon and includes the fixed substrate 51 and the movable substrate 52 so bonded to each other that they face each other with the fixed reflection film 54 provided on the fixed substrate 51 and the movable reflection film 55 provided on the movable substrate 52, but the configuration of the wavelength tunable interference filter 5 is not limited thereto.

For example, the wavelength tunable interference filter 5 may be so configured that the fixed substrate 51 and the movable substrate 52 are not bonded to each other but a gap changer that changes the gap between the reflection films, such as a piezoelectric device, is provided between the substrates.

Further, the wavelength tunable interference filter 5 is not necessarily formed of two substrates. For example, the wavelength tunable interference filter may be so configured that two reflection films are layered on a single substrate with a sacrifice layer between the reflection films and the sacrifice layer is etched away or otherwise removed to form a gap.

Moreover, as each of the spectroscopic devices, an AOTF, an LCTF, or any other similar device may be used. In this case, however, size reduction of the spectroscopic camera (spectroscopic analysis apparatus 10, 10A, and 10B) is likely to be difficult. It is therefore preferable to use a Fabry-Perot etalon.

Further, in each of the embodiments described above, the wavelength tunable interference filter 5 that can change the wavelength of transmitted light by changing the gap G1 between the reflection films 54 and 55 is presented by way of example, but the wavelength tunable interference filter 5 is not necessarily used. For example, a wavelength-fixed interference filter (Fabry-Perot etalon) may be used. In this case, the amount of light at an abnormal pixel can be appropriately corrected in a spectroscopic image of a specific wavelength according to the gap between the reflection films of the interference filter.

In addition, the specific structure according to any of the embodiments of the invention can be changed as appropriate in actual implementation of the invention to any other structure to the extent that the advantage of the invention is achieved.

The entire disclosure of Japanese Patent Application No. 2013-032930 filed on Feb. 22, 2013 is expressly incorporated by reference herein.

What is claimed is:

1. A spectroscopic camera comprising:
    a light source section that radiates first light and second light that travel in radiation directions different from each other toward an object being imaged;
    a spectroscopic device that separates light reflected off the object being imaged to select light of a predetermined wavelength;
    an imaging section that captures the light of the predetermined wavelength selected by the spectroscopic device to acquire a first spectroscopic image when the object being imaged is irradiated with the first light and a second spectroscopic image when the object being imaged is irradiated with the second light; and
    a processor programmed to:
        detect an abnormal pixel in the first spectroscopic image that is a pixel at a pixel location in the first spectroscopic image where a ratio of an amount of light at the pixel location to a reference amount of light obtained when a reference object is irradiated with the first or second light is greater than or equal to a predetermined value; and
        replace the amount of light at the pixel location of the abnormal pixel in the first spectroscopic image with the amount of light at the same pixel location of a pixel at the same pixel location of the detected abnormal pixel in the first spectroscopic image in the second spectroscopic image.

2. The spectroscopic camera according to claim 1, wherein the spectroscopic device is capable of changing the wavelength to be selected.

3. The spectroscopic camera according to claim 1, wherein the light source section includes a first light source that radiates the first light and a second light source that radiates the second light.

4. The spectroscopic camera according to claim 1, wherein the light source section includes a light emitter and a direction changer that changes the direction in which light emitted from the light emitter travels.

5. A spectroscopic camera comprising:
    a light source section that radiates light toward an object being imaged;
    a first spectroscopic device that separates light reflected off the object being imaged and traveling in a first direction to select light of a predetermined wavelength;
    a second spectroscopic device that separates light reflected off the object being imaged and traveling in a second direction that is different from the first direction to select light of the predetermined wavelength;
    a first imaging section that captures the light of the predetermined wavelength selected by the first spectroscopic device to acquire a first spectroscopic image;
    a second imaging section that captures the light of the predetermined wavelength selected by the second spectroscopic device to acquire a second spectroscopic image; and
    a processor programmed to:
        detect an abnormal pixel in the first spectroscopic image that is a pixel at a pixel location where the ratio of the amount of light at the pixel location to a reference amount of light obtained when a reference object is irradiated with light is greater than or equal to a predetermined value; and
        replace the amount of light at the pixel location of the abnormal pixel in the first spectroscopic image with the amount of light at the same pixel location of a pixel at the same pixel location in the second spectroscopic image.

6. The spectroscopic camera according to claim 5, wherein each of the first and second spectroscopic devices is capable of changing the wavelength to be selected.

7. The spectroscopic camera according to claim 1, wherein the processor is further programmed to:
    detect an abnormal pixel in the second spectroscopic image that is a pixel at a pixel location where a ratio of an amount of light at the pixel location in the second spectroscopic image to the reference amount of light is greater than or equal to the predetermined value, and
    when the pixel location of the detected abnormal pixel in the first spectroscopic image and the pixel location of the detected abnormal pixel in the second spectroscopic image are not the same, replace the amount of light of the pixel at the pixel location of the detected abnormal pixel in the first spectroscopic image with an average of the amounts of light of the pixels at the same pixel location of the detected abnormal pixel in the first spectroscopic image in the first and second spectroscopic images.

8. The spectroscopic camera according to claim 1, wherein the spectroscopic device is a wavelength tunable Fabry-Perot etalon.

9. A spectroscopic apparatus comprising:
    a camera that captures a first spectroscopic image produced when an object being imaged is irradiated with first light and a second spectroscopic image produced when the object being imaged is irradiated with second light that is different from the first light in terms of radiation direction, and
    a processor connected to the camera and programmed to:
        determine whether or not an amount of light received at each pixel in the first spectroscopic image is an abnormal value, and
        when the amount of light received at a pixel is the abnormal value, replace the amount of light received at the pixel location of the abnormal pixel with an amount of light received at the same pixel location of a pixel at the same pixel location of the detected abnormal pixel in the first spectroscopic image in the second spectroscopic image.

* * * * *